United States Patent
Katsurahira

(10) Patent No.: US 9,046,978 B2
(45) Date of Patent: Jun. 2, 2015

(54) POSITION DETECTING DEVICE

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 160 days.

(21) Appl. No.: 13/782,809

(22) Filed: Mar. 1, 2013

(65) Prior Publication Data
US 2013/0249854 A1  Sep. 26, 2013

(30) Foreign Application Priority Data

Mar. 23, 2012 (JP) ................................. 2012-066748

(51) Int. Cl.
| | |
|---|---|
| *G06F 3/038* | (2013.01) |
| *G06F 3/044* | (2006.01) |
| *G06F 3/041* | (2006.01) |

(52) U.S. Cl.
CPC ...... *G06F 3/044* (2013.01); *G06F 2203/04808* (2013.01); *G06F 3/038* (2013.01); *G06F 2203/04106* (2013.01); *G06F 3/0416* (2013.01); *G06F 2203/04104* (2013.01)

(58) Field of Classification Search
USPC ....................................................... 345/173
See application file for complete search history.

(56) References Cited

U.S. PATENT DOCUMENTS

| | | | | |
|---|---|---|---|---|
| 2004/0155871 A1* | 8/2004 | Perski et al. | ................... | 345/174 |
| 2006/0262056 A1* | 11/2006 | Masutani et al. | ................ | 345/87 |
| 2008/0012835 A1* | 1/2008 | Rimon et al. | ................... | 345/173 |
| 2008/0170046 A1* | 7/2008 | Rimon et al. | ................... | 345/174 |
| 2010/0155153 A1* | 6/2010 | Zachut | ........................ | 178/18.03 |
| 2010/0328240 A1* | 12/2010 | Matsubara | .................... | 345/173 |

FOREIGN PATENT DOCUMENTS

| | | |
|---|---|---|
| JP | 5006153 A | 1/1993 |
| JP | 8179871 A | 7/1996 |
| JP | 10020992 A | 1/1998 |

* cited by examiner

*Primary Examiner* — Linh N Hoffner
(74) *Attorney, Agent, or Firm* — Seed IP Law Group PLLC

(57) ABSTRACT

A position detecting device is provided, which is capable of stably detecting an indicator with less susceptibility to the influence of noise by using a differential amplifier circuit and multi-touch. The device includes a sensor having an electrode pattern formed of plural first electrodes arranged in a first direction and plural second electrodes arranged in a second direction. The device selects two sets of the first electrodes separate from each other by a distance equivalent to a predetermined number of electrodes and supplies two drive signals having phases inverted from each other. The device selects two sets of the second electrodes separate from each other by a distance equivalent to a predetermined number of electrodes and connects the selected second electrodes to two differential inputs of a differential amplifier circuit. The device controls selection of two sets of the first electrodes and two sets of the second electrodes.

11 Claims, 22 Drawing Sheets

FIG.1
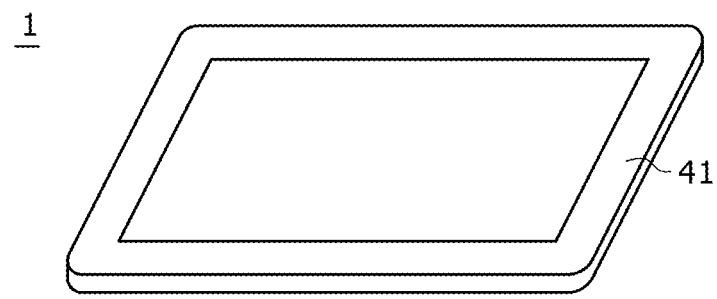
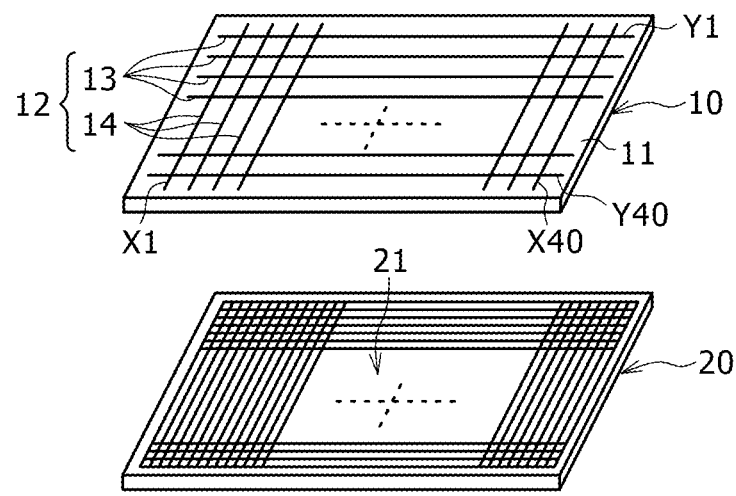
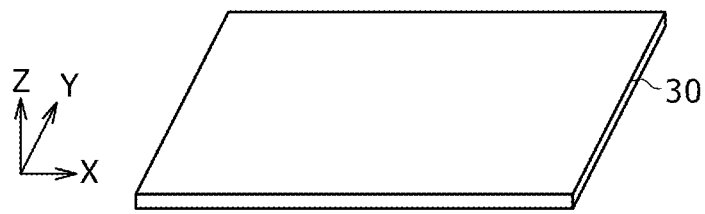
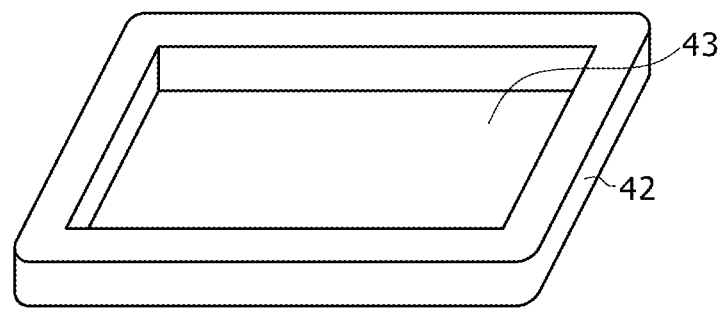

POSITION DETECTING DEVICE

CROSS-REFERENCE TO RELATED APPLICATION(S)

The present application claims priority under 35 U.S.C. 119(a) of Japanese Application No. 2012-066748, filed Mar. 23, 2012, the entire content of which is incorporated herein by reference.

BACKGROUND

1. Technical Field

This invention relates to a position detecting device capable of detecting plural positions indicated by electrically conductive indicators, such as fingers, using a capacitive system.

2. Description of the Related Art

In recent years, the tablet-type information terminal equipped with a touch panel has come to be widely used. In particular, advancement has been made on techniques to detect multi-touch associated with a gesture function and so forth by detecting simultaneous instruction inputs by plural fingers.

As a technique for detecting this multi-touch, the capacitive system like that disclosed in, e.g., Patent Document 1 (Japanese Patent Laid-open No. Hei 8-179871) is widely used. Specifically, the position detecting device of a touch panel disclosed in this Patent Document 1 is so configured that plural line-shape electrodes are disposed in the vertical direction and the horizontal direction of the panel surface and a predetermined drive signal is supplied to the line-shape electrodes of one of the vertical direction and the horizontal direction to obtain a reception signal thereof from the line-shape electrodes of the other. Furthermore, the intersections formed by the line-shape electrodes of the vertical direction and the horizontal direction are sequentially selected and the intensity of the reception signal is obtained to obtain the finger position based on the signal distribution thereof.

According to the position detecting device disclosed in this Patent Document 1, a signal corresponding to the finger placed only near the intersection of the selected line-shape electrode of the vertical direction and the selected line-shape electrode of the horizontal direction is detected. Therefore, even when plural fingers are simultaneously placed on the touch panel, the positions of the respective fingers can be accurately obtained without mutual interference.

The touch panel is configured by combining a position detecting device like the above-described device and a display device such as a liquid crystal display (LCD). In this case, noise generated by the display device enters the position detecting device, which frequently causes erroneous operation such as failure in correctly obtaining the position indicated by a finger and detection of an incorrect position. Therefore, in the touch panel using the capacitive position detecting device, removal of noise is an important challenge.

As the most effective method for removing this kind of noise, methods using a differential amplifier circuit are provided as disclosed in, e.g., Patent Document 2 (Japanese Patent Laid-open No. Hei 5-6153) and Patent Document 3 (Japanese Patent Laid-open No. Hei 10-20992). Specifically, two line-shape electrodes are simultaneously selected from the line-shape electrode group that obtains the reception signal among the vertical and horizontal line-shape electrodes. Furthermore, one of the selected electrodes is connected to the non-inverting input terminal (positive-side input terminal) of the differential amplifier circuit and the other is connected to the inverting input terminal (negative-side input terminal) of the differential amplifier circuit. Thereby, the noise component is canceled and only the signal difference attributed to the approach of a finger is detected.

BRIEF SUMMARY

However, in the position detecting device that simultaneously detects plural indicators such as fingers, i.e., in the device that is compatible with multi-touch, the detection system using the above-described differential amplifier circuit is not put into practical use. One of the reasons for this is as follows. Specifically, the reception signal from two line-shape electrodes is used in the detection system using the differential amplifier circuit. Therefore, even if an indicator is detected, it is difficult to determine which of these two line-shape electrodes the indicator such as a finger is placed on. Furthermore, a second reason is as follows. Specifically, if indicators such as fingers are simultaneously placed on two line-shape electrodes serving as the differential inputs of the differential amplifier circuit, change in the reception signal attributed to the approach of the indicators such as fingers is the same between these two line-shape electrodes. Thus, in some cases, the changes in the reception signal of them would precisely cancel out each other and no signal is detected in the output of the differential amplifier circuit.

That is, the capacitive position detecting device configured with a differential amplifier so as to be robust against noise has a problem that simultaneous input of plural points by plural indicators such as fingers cannot be performed on the panel and the device is not permitted to be compatible with multi-touch.

As a countermeasure against this problem, there is also an example of the capacitive position detecting device that is compatible with multi-touch and is made less susceptible to the influence of noise from an LCD or the like by setting the signal level of the drive signal high (setting the transmission voltage high) without using the differential amplifier circuit. However, in this case, there is not only a problem that the cost increases but also a problem that there is a limit to the increase in the transmission voltage.

According to an aspect of the invention, the above-described problems are addressed. A position detecting device is provided that can stably detect an indicator with less susceptibility to the influence of noise by using a differential amplifier circuit and is permitted to be compatible with multi-touch.

To solve the above-described problems, a position detecting device is provided, which includes a sensor having an electrode pattern formed of a plurality of first electrodes arranged in a first direction and a plurality of second electrodes arranged in a second direction intersecting with the first direction. The position detecting device supplies a drive signal to the first electrodes and detects the position of an indicator on the electrode pattern from a reception signal obtained from the second electrodes. The position detecting device includes:

a first selection circuit configured to select two sets of the second electrodes separate from each other by a distance equivalent to a second predetermined number of electrodes from the plurality of second electrodes, a second selection circuit configured to select two sets of the first electrodes separate from each other by a distance equivalent to a first predetermined number of electrodes from the plurality of first electrodes, a drive signal supply circuit configured to supply the drive signal to each of the two sets of the first electrodes selected by the second selection circuit and to output two signals having phases inverted from each other, a differential amplifier circuit having a non-inverting input terminal, to which one set of the two sets of the second electrodes selected by the first selection circuit is connected, and an inverting input terminal, to which the other set of the two sets of the second electrodes is connected, and a detection circuit configured to detect the position of the indicator on the electrode pattern from an output signal of the differential amplifier circuit.

Furthermore, the invention of claim 2 provides the position detecting device according to claim 1, further including:

a control circuit that controls selection by the first and second selection circuits and determines the first and second predetermined numbers in such a manner that only one intersection among four intersections formed by the respective two sets of electrodes selected by the first and second selection circuits is near the indicator when the positions of a plurality of indicators are detected by the detection circuit.

In the position detecting device with the above-described configuration, when the positions of the plural indicators are detected by the detection circuit, all of plural pieces of position information of the detected indicators are known. The control circuit carries out the selection by the first selection circuit and the second selection circuit based on this known position information of the plural indicators. In this case, based on the plural pieces of position information of the detected indicators, the control circuit determines the first and second predetermined numbers and carries out the selection by the first and second selection circuits in such a manner as to make the following state. Specifically, when one of the indicators is located near one intersection among four intersections formed by the respective two sets of electrodes selected by the first and second selection circuits, the other intersections of four intersections are not near the positions of the plural indicators.

Therefore, according to this invention, even when plural indicators are placed on the position detection surface, the differential amplifier circuit can detect each indicator without the influence of other indicators on the position detection surface.

The invention of claim 6 provides a position detecting device including a sensor having a lattice-shaped electrode pattern formed of a plurality of first electrodes arranged in a first direction and a plurality of second electrodes arranged in a second direction intersecting with the first direction. The position detecting device supplies a drive signal to the first electrodes and detects the position of an indicator on the electrode pattern from a reception signal obtained from the plurality of second electrodes. The position detecting device includes:

a drive signal supply circuit configured to supply a predetermined drive signal to the plurality of first electrodes, a first selection circuit configured to select two sets of the second electrodes separate from each other by a distance equivalent to a predetermined number of electrodes from the plurality of second electrodes, a second selection circuit configured to select the first electrode to which the drive signal is supplied, a differential amplifier circuit having a non-inverting input terminal, to which one set of the two sets of the second electrodes selected by the first selection circuit is connected, and an inverting input terminal, to which the other set of the two sets of the second electrodes is connected, a detection circuit configured to detect the position of the indicator on the electrode pattern from an output signal of the differential amplifier circuit, and a control circuit that carries out, for the first selection circuit, first selection control to select the two sets of the second electrodes in such a manner that a signal from the second electrode at a position other than the detection position of the indicator is supplied to one of the non-inverting input terminal and the inverting input terminal of the differential amplifier circuit, when a signal from the second electrode at the detection position of the indicator is supplied to the other of the non-inverting input terminal and the inverting input terminal, based on plural pieces of position information of the indicators detected when the positions of a plurality of indicators are detected by the detection circuit.

In the position detecting device of the invention of claim 6 with the above-described configuration, when the positions of the plural indicators are detected by the detection circuit, all of plural pieces of position information of the detected indicators are known. Based on this known position information of the plural indicators, the control circuit controls the selection by the first selection circuit to select the sets of the second electrodes connected to the non-inverting input terminal and the inverting input terminal, respectively, of the differential amplifier circuit. In this case, based on the plural pieces of position information of the detected indicators, the control circuit selects two sets of the second electrodes in such a manner that a signal from the second electrode at a position other than the detection position of the indicator is supplied to one of the non-inverting input terminal and the inverting input terminal of the differential amplifier circuit when a signal from the second electrode at the detection position of the indicator is supplied to the other of the non-inverting input terminal and the inverting input terminal.

Therefore, according to this invention, even when plural indicators are placed on the sensor, the differential amplifier circuit can detect each indicator without the influence of other indicators on the sensor.

This invention permits a capacitive position detecting device that can stably detect an indicator with less susceptibility to the influence of noise, by using a differential amplifier circuit to simultaneously detect plural indicators, and thus is compatible with multi-touch.

BRIEF DESCRIPTION OF THE SEVERAL VIEWS OF THE DRAWINGS

FIG. 1 is an exploded configuration diagram of an embodiment of a position detecting device according to this invention;

DETAILED DESCRIPTION

Figure 2:
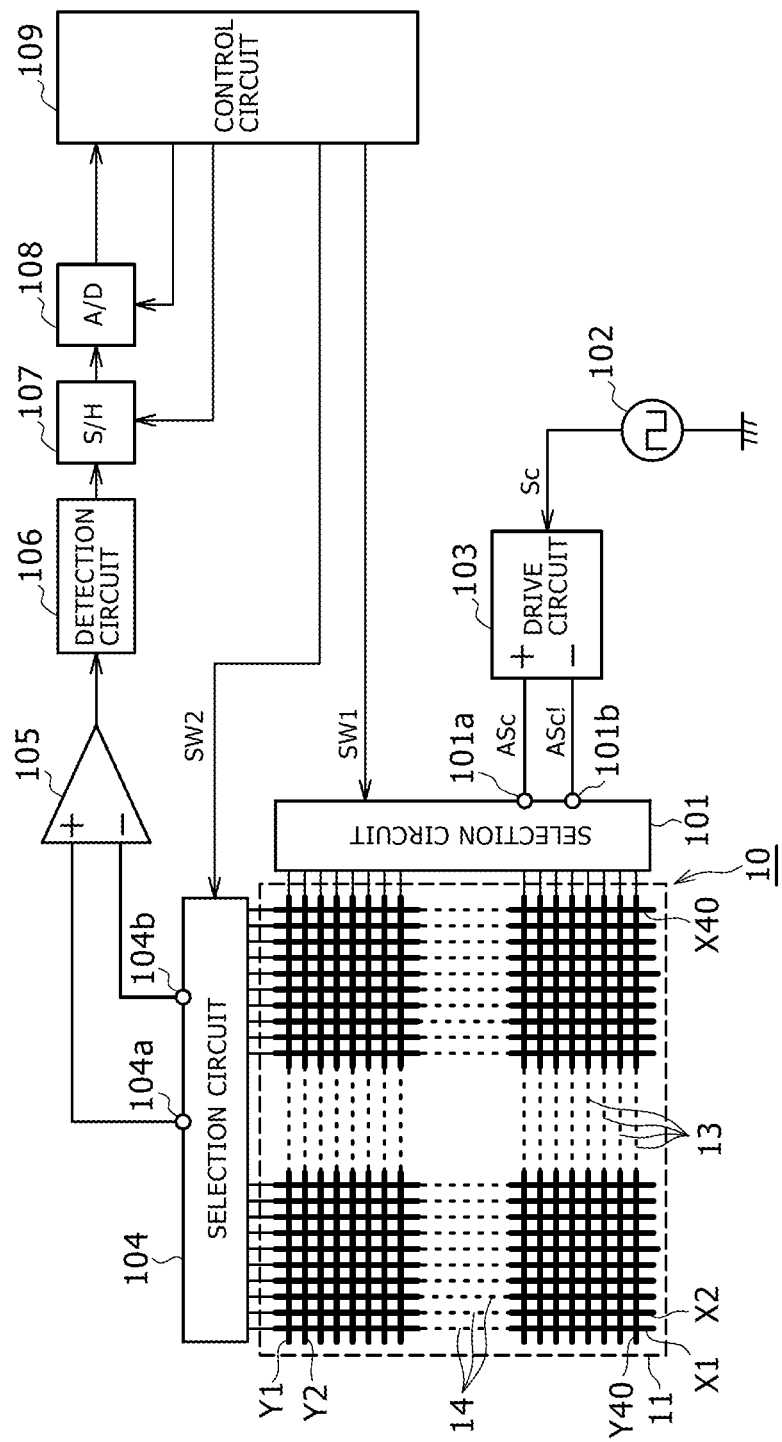
FIG. 2 is a diagram showing the configuration of a processing circuit in an embodiment of the position detecting device according to this invention.

An embodiment of the position detecting device according to this invention will be described below with reference to the drawings.

FIG. 1 shows an exploded configuration diagram of a tablet device as an embodiment of the position detecting device according to this invention.

As shown in FIG. 1, a tablet device 1 of this example is configured by a position detecting sensor 10, an LCD 20 as a display device, a printed wiring board 30, and an upper case 41 and a lower case 42 that configure the chassis of the tablet device 1. The position detecting sensor 10 is so disposed as to be overlapped on a display surface 21 of this LCD 20.

In the position detecting sensor 10, a transparent electrode group 12 composed of plural electrodes having optical transparency is disposed on a transparent substrate 11. The transparent electrode group 12 is composed of a first transparent electrode group 13 of plural, e.g., 40, electrodes arranged in the Y-axis direction and a second transparent electrode group 14 of plural, e.g., 40, electrodes arranged in the X-axis direction perpendicular to the Y-axis direction.

In this example, the transparent substrate 11 is formed by bonding two glass substrates to each other. The first transparent electrode group 13 is formed on the glass substrate on the opposite side to the operation surface (on the side of the surface opposed to the display surface 21 of the LCD 20), of these two glass substrates, and the second transparent electrode group 14 is formed on the side of the operation surface.

The first transparent electrode group 13 is composed of 40 first transparent electrodes Y1 to Y40 that are arranged in the Y-axis direction at equal intervals and have an elongated line shape, and the second transparent electrode group 14 is composed of 40 second transparent electrodes X1 to X40 that are arranged in the X-axis direction at equal intervals and have an elongated line shape. These first transparent electrodes Y1 to Y40 and second transparent electrodes X1 to X40 are configured by a conductor formed of an electrically-conductive material having optical transparency, specifically, e.g., an indium tin oxide (ITO) film.

Therefore, the transparent electrode group 12 has an electrode pattern in which 40 first transparent electrodes (hereinafter, referred to as the Y-axis electrodes) Y1 to Y40 and 40 second transparent electrodes (hereinafter, referred to as the X-axis electrodes) X1 to X40 are disposed in a lattice form with the lines of the electrodes set perpendicular to each other. In this example, two glass substrates configuring the transparent substrate 11 are bonded to each other in such a manner that the surfaces of the ITO film face each other and a transparent insulating sheet is sandwiched therebetween.

On the printed wiring board 30, electronic parts configuring an electronic circuit for processing and controlling signals from the position detecting sensor 10, a drive circuit for display of the LCD 20, and so forth are mounted.

The upper case 41 and the lower case 42 configuring the chassis of the tablet device 1 are each formed by, e.g., a synthetic resin. In the lower case 42 of this chassis, a recess 43 for housing the transparent substrate 11, in which the position detecting sensor 10 is disposed, the LCD 20, and the printed wiring board 30 is formed. After the transparent substrate 11, in which the position detecting sensor 10 is disposed, the LCD 20, and the printed wiring board 30 are housed in this recess 43, the upper case 41 is bonded to the lower case 42 by an adhesive for example. Thereby, the recess 43 is sealed and the tablet device 1 is assembled.

The transparent substrate 11, on which the first transparent electrode group 13 and the second transparent electrode group 14 are disposed as described above, and the printed wiring board 30 include a processing circuit that is for processing and control of signals from the position detecting sensor 10 and has a configuration shown in FIG. 2.

In the transparent substrate 11 of the position detecting sensor 10, the Y-axis electrodes Y1 to Y40 configuring the first transparent electrode group 13 are connected to a selection circuit 101. The selection circuit 101 is configured by analog switches and arbitrarily selects two groups (two sets) of the Y-axis electrodes from the Y-axis electrodes Y1 to Y40. These selected two groups are electrically connected to a positive-side selection terminal 101a and a negative-side selection terminal 101b, respectively.

A clock generating circuit 102 generates a clock signal Sc having a predetermined frequency equivalent to the frequency of a drive signal to the position detecting sensor 10 and supplies the generated clock signal Sc to a drive circuit 103. The drive circuit 103 generates the drive signal having the predetermined frequency based on the clock signal Sc supplied from the clock generating circuit 102. In this example, the drive circuit 103 generates a positive-phase drive signal ASc and an opposite-phase drive signal ASc! (in this specification, ! is used as the symbol meaning the opposite phase), whose phases are shifted from each other by 180 degrees, from the positive-side output terminal and the negative-side output terminal. Two drive signals ASc and ASc! from this drive circuit 103 are supplied to the positive-side selection terminal 101a and the negative-side selection terminal 101b of the selection circuit 101.

A selection circuit 104 has the same configuration as that of the selection circuit 101 and the X-axis electrodes X1 to X40 of the second transparent electrode group 14 are connected to this selection circuit 104. This selection circuit 104 arbitrarily selects two groups (two sets) of the X-axis electrodes from the X-axis electrodes X1 to X40, and these selected two groups are electrically connected to a positive-side selection terminal 104a and a negative-side selection terminal 104b, respectively.

The positive-side selection terminal 104a and the negative-side selection terminal 104b of this selection circuit 104 are connected to the non-inverting input terminal (hereinafter, referred to as the positive-side input terminal) and the inverting input terminal (hereinafter, referred to as the negative-side input terminal), respectively, of a differential amplifier circuit 105.

The output terminal of the differential amplifier circuit 105 is connected to the input terminal of a detection circuit 106. The detection circuit 106 detects the signal level of the frequency component of the clock signal Sc included in the signal from the differential amplifier circuit 105. The output terminal of the detection circuit 106 is connected to the input terminal of a sample/hold circuit 107. The sample/hold circuit 107 samples and holds the signal level detected by the detection circuit 106 and outputs the voltage equivalent to this held signal level.

The output terminal of this sample/hold circuit 107 is connected to the input terminal of an analog-to-digital (A/D) conversion circuit 108. The output terminal of this A/D conversion circuit 108 is connected to a control circuit 109 configured by a microcomputer. Therefore, the A/D conversion circuit 108 converts the signal level of the frequency component of the clock signal Sc, held by the sample/hold circuit 107, to a digital signal and supplies it to the control circuit 109.

The control circuit 109 supplies selection control signals SW1 and SW2 to the selection circuits 101 and 104. Furthermore, the control circuit 109 supplies a control signal to each of the sample/hold circuit 107 and the A/D conversion circuit 108. The control circuit 109 carries out operation to be described later in accordance with a predetermined program stored in a built-in memory.

Figure 3:
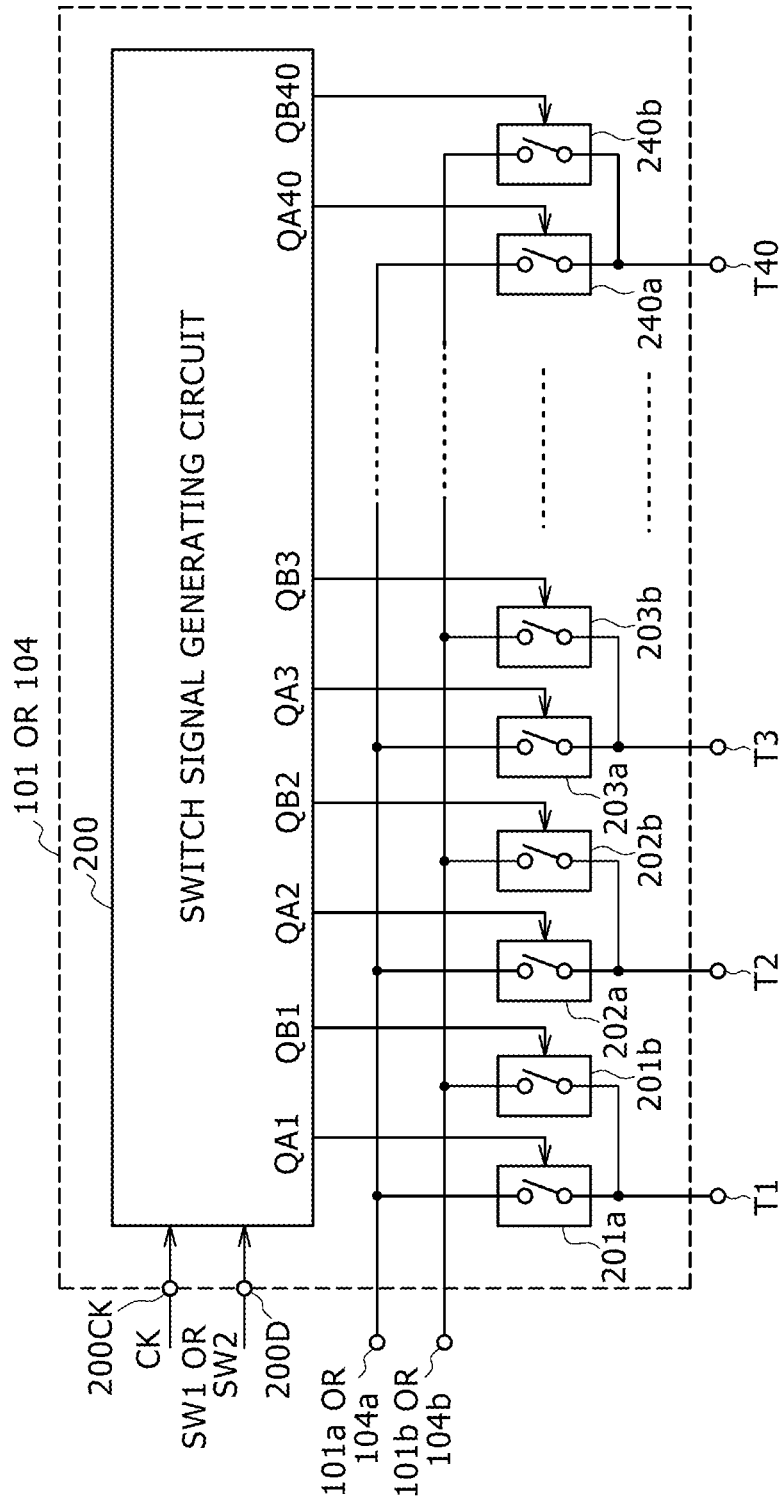
FIG. 3 is a diagram showing a configuration example of a portion of the circuit of FIG. 2.

FIG. 3 shows an internal configuration example of the selection circuits 101 and 104. Each of the selection circuits 101 and 104 is composed of a switch signal generating circuit 200 and 40 pairs of analog switches 201a and 201b, 202a and 202b, 203a and 203b, . . . , and 240a and 240b.

Although not shown in the diagram, the switch signal generating circuit 200 is formed of, e.g., two shift registers, a gate circuit, and so forth. It receives a clock signal CK input via a clock input terminal 200CK and receives the selection control signal SW1 or SW2 from the control circuit 109 via a terminal 200D to generate 40 pairs of switch control signals QA1 and QB1, QA2 and QB2, QA3 and QB3, . . . , and QA40 and QB40 to switch the on-state and the off-state of 40 pairs of the analog switches 201a and 201b, 202a and 202b, 203a and 203b, . . . , and 240a and 240b.

One-terminal sides of the analog switches of each pair are connected to each other. Specifically, one-terminal sides of the analog switches 201a and 201b are connected to each other, and this is the same also for the analog switches 202a and 202b, 203a and 203b, . . . , and 240a and 240b. In addition, the connecting nodes of the respective pairs are connected to connection terminals T1, T2, T3, . . . , and T40 that are each connected to a respective one of 40 electrodes.

Furthermore, the other-terminal sides of the analog switches 201a, 202a, 203a, . . . , and 240a each configuring one of the pair are connected to each other and the connecting nodes thereof are connected to the positive-side selection terminal 101a or 104a. Moreover, the other-terminal sides of the analog switches 201b, 202b, 203b, . . . , and 240b each configuring the other of the pair are connected to each other and the connecting nodes thereof are connected to the negative-side selection terminal 101b or 104b.

Operation of Position Detecting Device of Embodiment

Next, the operation of the tablet device 1 as an embodiment of the position detecting device of this invention, configured in the above-described manner, will be described. Although it is also possible to use not only a finger but also a position indicator having a pen shape as the indicator, the following description will be made based on the premise that the indicator is mainly a finger.

The tablet device 1 of this example first carries out a whole-surface scan operation to detect the rough position of the indicator in order to check whether a finger is placed at any place on the position detecting sensor 10. When it is detected that a finger is placed at any place on the position detecting sensor 10 and the rough position thereof is detected by this whole-surface scan operation, a partial scan operation is carried out in the vicinity of the detected rough position in order to detect the detailed position of this indicator. Furthermore, for the indicator whose position is detected on the position detecting sensor 10, a tracking scan operation to track the movement of the position indicated by this indicator is carried out.

The tablet device 1 of this example repeatedly carries out the whole-surface scan, the partial scan, and the tracking scan to thereby be capable of detecting indicated positions regarding plural indicators and tracking these indicated positions. Next, each of the whole-surface scan, the partial scan, and the tracking scan will be described.

[Whole-Surface Scan Operation]

Figure 4:
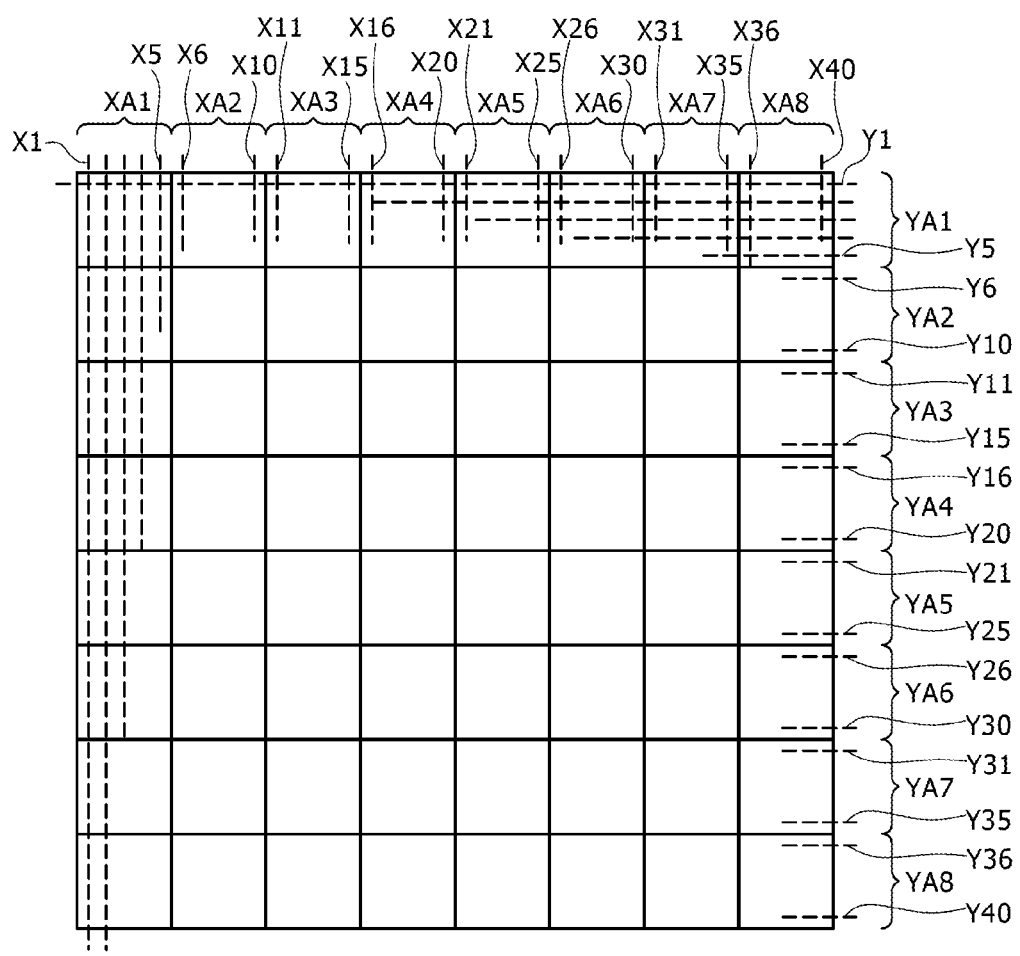
FIG. 4 is a diagram showing area division in a whole-surface scan operation.

In this embodiment, in order to carry out the whole-surface scan operation at high speed, the control circuit 109 of the tablet device 1 of this example divides the first transparent electrode group 13 arranged in the Y-axis direction into plural areas, specifically eight areas in this example, and simultaneously selects the plural (five, in this example) Y-axis electrodes in one area. Furthermore, also for the second transparent electrode group 14 arranged in the X-axis direction, the control circuit 109 divides it into plural areas, specifically eight areas in this example, and simultaneously selects the plural (five, in this example) X-axis electrodes in one area. FIG. 4 is a diagram showing how the area division is made in this whole-surface scan operation.

Specifically, in this example, 40 X-axis electrodes X1 to X40 are divided into a first area XA1 composed of five X-axis electrodes X1 to X5, a second area XA2 composed of five X-axis electrodes X6 to X10, a third area XA3 composed of five X-axis electrodes X11 to X15, a fourth area XA4 composed of five X-axis electrodes X16 to X20, a fifth area XA5 composed of five X-axis electrodes X21 to X25, a sixth area XA6 composed of five X-axis electrodes X26 to X30, a seventh area XA7 composed of five X-axis electrodes X31 to X35, and an eighth area XA8 composed of five X-axis electrodes X36 to X40. Five X-axis electrodes are simultaneously selected in each of the divided areas XA1 to XA8.

Furthermore, in this example, 40 Y-axis electrodes Y1 to Y40 are divided into a first area YA1 to an eighth area YA8 each composed of five Y-axis electrodes similarly to the above-described X-axis electrodes X1 to X40, and five Y-axis electrodes are simultaneously selected in each of the divided areas YA1 to YA8.

Figure 5:
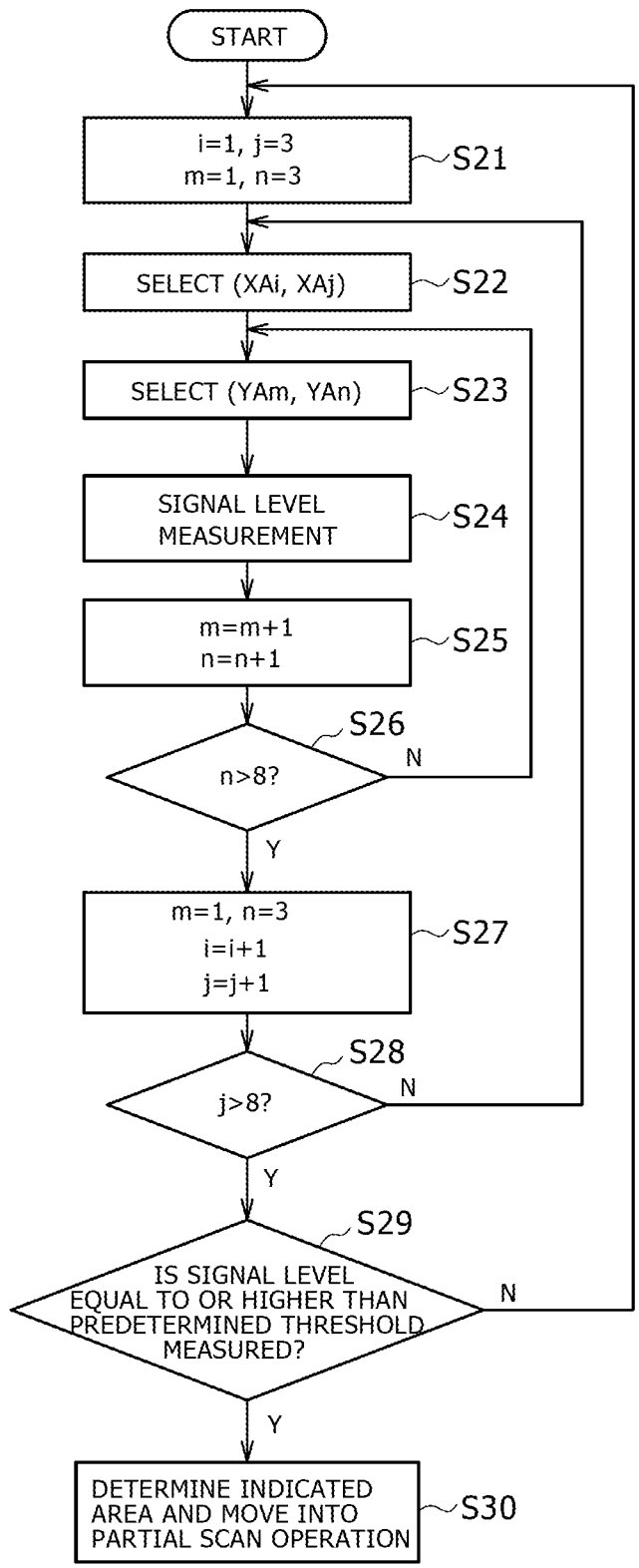
FIG. 5 is a diagram showing a flowchart of the whole-surface scan operation in an embodiment of the position detecting device according to this invention.

FIG. 5 is a flowchart showing the flow of processing of the whole-surface scan operation in this embodiment. In this FIG. 5, a description of "Select (XAi, XAj)" in a step S22 to be described later shows that the selection circuit 104 selects all X-axis electrodes of the i-th area XAi among the eight areas XA1 to XA8 along the X-axis direction to simultaneously connect them to the positive-side selection terminal 104a and selects all X-axis electrodes of the j-th area XAj to simultaneously connect them to the negative-side selection terminal 104b. Similarly, a description of "Select (YAm, YAn)" in a step S23 to be described later shows that the selection circuit 101 selects all Y-axis electrodes of the m-th area YAm among the eight areas YA1 to YA8 along the Y-axis direction to simultaneously connect them to the positive-side selection terminal 101a and selects all Y-axis electrodes of the n-th area YAn to simultaneously connect them to the negative-side selection terminal 101b.

In this embodiment, as shown in FIG. 3, the selection circuit 101 can select which of the positive-side selection terminal 101a and the negative-side selection terminal 101b each of the Y-axis electrodes Y1 to Y40, which are connected to the terminals T1 to T40, is connected to, based on which of the paired analog switches 201a to 240a and 201b to 240b is turned on. Similarly, the selection circuit 104 can also select which of the positive-side selection terminal 104a and the negative-side selection terminal 104b each of the X-axis electrodes X1 to X40, which are connected to the terminals T1 to T40, is connected to.

Figure 6:
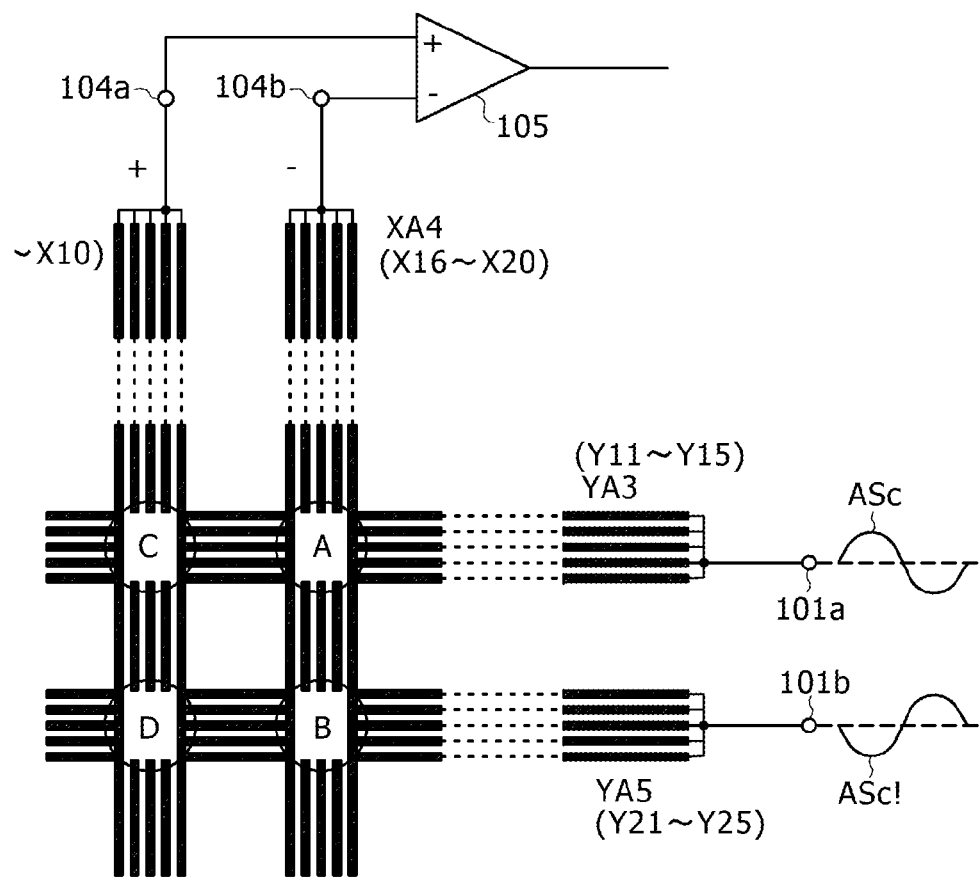
FIG. 6 is a diagram for explaining the whole-surface scan operation in an embodiment of the position detecting device according to this invention.

Therefore, as shown in FIG. 6, the selection circuit 101 can select the state in which the drive signal ASc as one of two drive signals ASc and ASc! from the drive circuit 103 is supplied to the upper area (area with smaller electrode numbers) and the drive signal ASc! is supplied to the lower area (area with larger electrode numbers). Furthermore, it is also possible for the selection circuit 101 to make the reverse selection state. Similarly, as shown in FIG. 6, the selection circuit 104 can connect the positive-side input terminal of the differential amplifier circuit 105 to the left area (area with smaller electrode numbers) and connect the negative-side input terminal to the right area (area with larger electrode numbers). Furthermore, it is also possible for the selection circuit 104 to make the reverse selection state.

However, no difference is caused in the operation whichever selection state is made. Therefore, for easy understanding, the following description will be made based on the premise that the electrodes with smaller electrode numbers among the selected electrodes are connected to the positive-side selection terminal and the electrodes with larger electrode numbers are connected to the negative-side selection terminal regarding both the X-axis electrodes X1 to X40 and the Y-axis electrodes Y1 to Y40.

In the flowchart of FIG. 5, first the control circuit 109 sets the initial values of two areas XAi and XAj along the X-axis direction selected by the selection circuit 104 to i=1 and j=3. In addition, the control circuit 109 sets the initial values of two areas YAm and YAn along the Y-axis direction selected by the selection circuit 101 to m=1 and n=3 (step S21).

Next, the control circuit 109 supplies the selection control signal SW2, to make the selection in accordance with the set i and j, to the selection circuit 104 to select (XAi, XAj) (step S22). Subsequently, the control circuit 109 supplies the selection control signal SW1, to make the selection in accordance with the set m and n, to the selection circuit 101 to select (YAm, YAn) (step S23). Then, the control circuit 109 captures the digital signal from the A/D conversion circuit 108 at this timing and measures the signal level of the reception signal from the differential amplifier circuit 105 (step S24).

Next, the control circuit 109 executes processing of adding 1 to each of the variables m and n so that two areas YAm and YAn along the Y-axis direction are each shifted to the next lower area (area with larger electrode numbers) (step S25), and determines whether or not n>8 is satisfied (step S26). Upon determining in the step S26 that n>8 is not satisfied, the control circuit 109 returns the processing to the step S23 and repeats the processing of this step S23 and the subsequent steps.

Upon determining in the step S26 that n>8 is satisfied, the control circuit 109 returns the variables m and n to the initial values m=1 and n=3 and executes processing of adding 1 to each of the variables i and j (step S27). Then, the control circuit 109 determines whether or not j>8 is satisfied (step S28). When determining in the step S28 that j>8 is not satisfied, the control circuit 109 returns the processing to the step S22 and repeats the processing of this step S22 and the subsequent steps.

Upon determining in the step S28 that j>8 is satisfied, the control circuit 109 compares the signal level for each area measured in the step S24 with a predetermined threshold value to determine whether or not a signal level equal to or higher than this predetermined threshold value is detected (step S29).

Upon determining in this step S29 that a signal level equal to or higher than the predetermined threshold value is not detected, the control circuit 109 returns the processing to the step S21 to restart the whole-surface scan operation. Upon determining in the step S29 that a signal level equal to or higher than the predetermined threshold value is detected, the control circuit 109 determines that the area for which the signal level equal to or higher than the predetermined threshold value is detected is an area including the position indicated by an indicator, and moves into the partial scan operation (step S30).

As is apparent from the flow of the above-described processing of FIG. 5, in this embodiment, the selection circuits 101 and 104 select the electrode groups connected to the positive-side selection terminals 101a and 104a and the negative-side selection terminals 101b and 104b in such a manner that the selected electrode groups are separate from each other across one area regarding both the X-axis and Y-axis electrodes. In this embodiment, this selection processing in the selection circuits 101 and 104 is executed not only in this whole-surface scan operation but also in the partial scan operation and the tracking scan operation to be described later similarly. However, although electrode groups are selected in units of the area composed of plural electrodes in the whole-surface scan operation, the number of electrodes as the unit of selection is different in the partial scan operation and the tracking scan operation.

Such selection of two groups (two sets) of electrodes by the selection circuits 101 and 104 is because of the following reason. In the following description, the electrode connected to the positive-side selection terminal 101a or 104a will be referred to as the positive-side selected electrode and the electrode connected to the negative-side selection terminal 101b or 104b will be referred to as the negative-side selected electrode.

First, the selection in the selection circuit 104 on the receiving side will be described. If the selection circuit 104 selects electrode areas in such a manner that the electrodes of adjacent two areas, specifically, e.g., the area XA1 and the area XA2, are employed as the positive-side selected electrodes and the negative-side selected electrodes, when a finger is placed precisely at a position straddling these selected two areas, the signals from the electrodes of two areas cancel out each other in the differential amplifier circuit 105 and the finger is not detected. To avoid this, in this embodiment, areas separate from each other across one area are employed as two areas selected by the selection circuit 104.

Also, selection of the Y-axis electrodes Y1 to Y40 is made by the selection circuit 101 on the driving side. Specifically, the selection circuit 101 selects two areas of the Y-axis electrodes so that differential signals, that are in opposite phase and are generated as the drive signal, are supplied to the positive-side selected electrode and the negative-side selected electrode, respectively. The reason for this is as follows.

Specifically, it is general to use transparent electrodes formed of an ITO film as the first transparent electrode group 13 and the second transparent electrode group 14 formed on the surface of the transparent substrate 11 as described above. However, the resistance value of the transparent electrode formed of the ITO film is large. Therefore, if the drive signal is supplied to only one group of electrodes (one or plural electrodes) on the driving side, the induced voltages depending on the signal level of the drive signal would differ between two intersections (each intersection is composed of one point or plural points), which are formed by two groups of the positive-side selected electrode and the negative-side selected electrode selected by the selection circuit 104 on the receiving side and one group of the electrode on the driving side, depending on the distance from the drive end of the first transparent electrodes Y1 to Y40 (supply end of the drive signal) and, thus, the induce voltages are not at the same level.

The signal level of an offset signal generated at this time differs depending on the position of the group of the selected electrode. In addition, it is affected by various kinds of factors such as variation in the characteristics of the position detecting sensor 10 as a whole and variation depending on the production lot. Thus, it becomes impossible to ensure stable operation. To avoid this, in this embodiment, two groups of electrodes are selected not only amongst the X-axis electrodes on the receiving side but also amongst the Y-axis electrodes on the driving side, and the drive signals in opposite phase are supplied to these selected two groups.

The reason why areas separate from each other across one area are employed as two areas selected by the selection circuit 101 on the driving side will be described below. If the selection circuit 101 selects electrode areas in such a manner that the electrodes of adjacent two areas, specifically, e.g., the area YA1 and the area YA2, are employed as the positive-side selected electrodes and the negative-side selected electrodes, when a finger is placed precisely at a position straddling these selected two areas, the positive-side drive signal and the negative-side drive signal cancel out each other and the finger is not detected. To avoid this, in this embodiment, areas separate from each other across one area are employed as the area of the positive-side selected electrodes and the area of the negative-side selected electrodes selected by the selection circuit 101.

The number of areas interposed between the positive-side selected electrodes and the negative-side selected electrodes by the selection circuits 101 and 104 is not limited to one and plural areas may be interposed. Furthermore, the distance interposed between the positive-side selected electrodes and the negative-side selected electrodes does not need to be set in units of areas. The distance may be equivalent to a smaller number of electrodes than the number of electrodes in one area or a larger number of electrodes than the number of electrodes in one area.

The flow of the above-described processing, as illustrated in the flowchart of FIG. 5, will be described in detail below. Specifically, first the control circuit 109 supplies the selection control signals SW1 and SW2 so that the selection circuit 101 may select two areas (YA1, YA3) and connect them to the drive circuit 103, and the selection circuit 104 may select two areas (XA1, XA3) and connect them to the differential amplifier circuit 105. In this state, the control circuit 109 controls the sample/hold circuit 107 and the A/D conversion circuit 108 to obtain the output from the A/D conversion circuit 108 as the signal level appearing in the differential amplifier circuit 105.

Next, the control circuit 109 carries out control based on the selection control signal SW1 so that the selection circuit 101 may select two areas (YA2, YA4), and similarly obtains the signal level. The control circuit 109 sequentially updates the selection by the selection circuit 101 and similarly obtains the signal level.

When the signal level from two areas (YA6, YA8), which are selected last by the selection circuit 101 about the Y-direction, is obtained, subsequently the control circuit 109 carries out control based on the selection control signal SW2 so that the selection circuit 104 may select two areas (XA2, XA4). In this state, the control circuit 109 obtains the signal level with sequential selection of two areas (YA1, YA3), (YA2, YA4), . . . , (YA6, YA8) by the selection circuit 101 similarly to the operation carried out thus far. In this manner, the control circuit 109 obtains the signal level for the areas to two areas (XA6, XA8) and two areas (YA6, YA8).

As described above, if a signal at a level equal to or higher than a certain level is not detected in any area selected in the whole-surface scan operation, this whole-surface scan operation is repeatedly carried out.

FIG. 6 is a diagram showing one state in the whole-surface scan operation. This FIG. 6 shows the operation when two areas of the third area and the fifth area (YA3, YA5) are selected as the Y-axis electrodes and two areas of the second area and the fourth area (XA2, XA4) are selected as the X-axis electrodes.

If a signal at a level equal to or higher than a predetermined level is detected from the differential amplifier circuit 105 at this time, four areas of A, B, C, and D in FIG. 6 are possible as the place at which a finger is placed at this time. A method for identifying which of these four areas A, B, C, and D the finger is placed at will be described below.

First, the control circuit 109 checks whether the signal level obtained when two areas (YA3, YA5) and (XA4, XA6), which form another combination involving the X-axis electrodes and the Y-axis electrodes that constitute the area A and the area B in FIG. 6, are selected in the above-described whole-surface scan operation is equal to or higher than a predetermined value. If the signal level in the case of the areas (YA3, YA5) and (XA4, XA6) of this combination is lower than the predetermined value, the control circuit 109 determines that the finger is placed at the area C or the area D in FIG. 6. If the signal level is equal to or higher than the predetermined value, the control circuit 109 determines that the finger is placed at the area A or the area B in FIG. 6.

Here, suppose that the signal level is equal to or higher than the predetermined value and therefore the control circuit 109 determines that the finger is placed at the area A or the area B in FIG. 6. Subsequently, the control circuit 109 checks whether the finger is placed at the area A or the area B. Specifically, the control circuit 109 checks whether the signal level obtained when the areas (YA5, YA7) and (XA4, XA6) are selected as a combination involving the X-axis electrodes and the Y-axis electrodes that constitute only the area B in FIG. 6 in the above-described whole-surface scan operation is equal to or higher than the predetermined value. If the signal level at this time is lower than the predetermined value, the control circuit 109 determines that the finger is placed at the area A in FIG. 6. If the signal level at this time is equal to or higher than the predetermined value, the control circuit 109 determines that the finger is placed at the area B in FIG. 6.

[Partial Scan Operation]

By the above-described whole-surface scan operation, the control circuit 109 can obtain the rough position at which the finger is placed. Next, the control circuit 109 carries out the partial scan operation in order to obtain the detailed position of the finger. This partial scan operation is composed of X-axis partial scan operation to obtain the position of the finger (position indicated by the finger) in the X-axis direction and Y-axis partial scan operation to obtain the position of the finger in the Y-axis direction, and both operations are sequentially carried out. The following description will be made based on the premise that, also in this partial scan operation, the selection circuits 101 and 104 connect the electrodes with smaller electrode numbers among the selected electrodes to the positive-side selection terminals 101a and 104a and connect the electrodes with larger electrode numbers to the negative-side selection terminals 101b and 104b similarly to the above-described whole-surface scan operation.

[X-Axis Partial Scan Operation]

In the X-axis partial scan operation, the precise position coordinate in the X-axis direction in the area including the position at which the finger is placed, detected by the whole-surface scan operation, is obtained. This X-axis partial scan operation will be described below with reference to FIG. 7 and FIG. 8 regarding the case in which a finger as an indicator is placed at the area B in FIG. 6.

Figure 7:
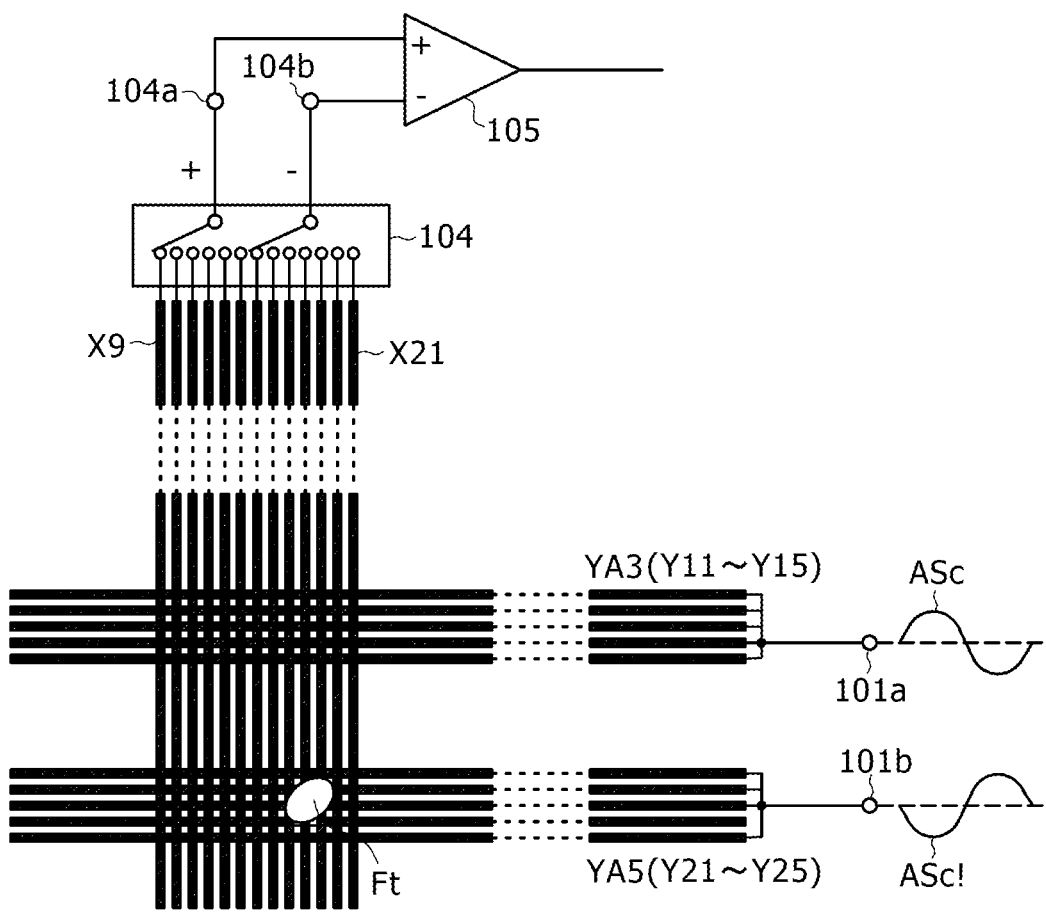
FIG. 7 is a diagram for explaining X-axis partial scan operation in an embodiment of the position detecting device according to this invention.

FIG. 7 is a diagram showing the X-axis partial scan operation for obtaining a coordinate CX in the X-axis direction in the area B. An elliptical area Ft at the overlapping part between the X-axis electrodes and the Y-axis electrodes schematically shows the position indicated by the finger as the indicator, and a position in the area B is assumed as the position indicated by the finger in the example of this FIG. 7. In this FIG. 7, the control circuit 109 controls the selection by the selection circuit 101 based on the selection control signal SW1 so that the following state may be obtained regarding the Y-axis electrodes. Specifically, similarly to the whole-surface scan operation, the combination of areas (YA3, YA5) is selected. In addition, the positive-phase drive signal ASc is supplied to five Y-axis electrodes Y11 to Y15 of the area YA3 and the opposite-phase drive signal ASc! is supplied to five Y-axis electrodes Y21 to Y25 of the area YA5 separate from the area YA3 across one area.

In this state, the control circuit 109 controls the selection circuit 104 to sequentially select the X-axis electrodes in the following manner. Specifically, one X-axis electrode is selected from the X-axis electrodes X15 to X21, which are obtained by adding one electrode each prior to and subsequent to the X-axis electrodes of the area XA4, and the selected electrode is connected to the negative-side input terminal of the differential amplifier circuit 105. In addition, one X-axis electrode is selected from the X-axis electrodes X9 to X15, which are respectively separate from the X-axis electrodes X15 to X21, across five electrodes, and the selected electrode is connected to the positive-side input terminal of the differential amplifier circuit 105. With this sequential selection of the X-axis electrodes, the control circuit 109 obtains the signal level. At this time, a signal at the level depending on the distance between the X-axis electrodes and the finger is detected.

By using the differential amplifier circuit 105, external noise can be canceled from the reception signal. The reason why the X-axis electrodes connected to the positive-side input terminal and the negative-side input terminal of the differential amplifier circuit 105 are separated from each other across a distance equivalent to a predetermined number of electrodes, specifically five electrodes in this example, is as follows. If this distance is short, coordinate calculation to be described later cannot be correctly performed when an indicator such as a finger is placed at a position straddling the X-axis electrode connected to the positive-side input terminal of the differential amplifier circuit 105 and the X-axis electrode connected to the negative-side input terminal. Furthermore, if this distance is too long, the noise level induced to the X-axis electrode connected to the positive-side input terminal of the differential amplifier circuit 105 and the X-axis electrode connected to the negative-side input terminal of the differential amplifier circuit 105 is not even, which precludes external noise from being completely canceled. Therefore, it is preferable that the distance between the electrodes selected as the electrodes connected to the positive-side input terminal and the negative-side input terminal of the differential amplifier circuit 105 be set somewhat larger than the maximum width of the contact area assumed when an indicator such as a finger comes in contact with the detection surface of the position detecting sensor 10.

In the above-described manner, the control circuit 109 sequentially selects (X9, X15), (X10, X16), (X11, X17), (X12, X18), (X13, X19), (X14, X20), and (X15, X21) as sets (Xk, Xk+6) of two X-axis electrodes selected by the selection circuit 104, and obtains the signal level of the output signal of the differential amplifier circuit 105 in association with each of the selected sets of two X-axis electrodes.

Figure 8:
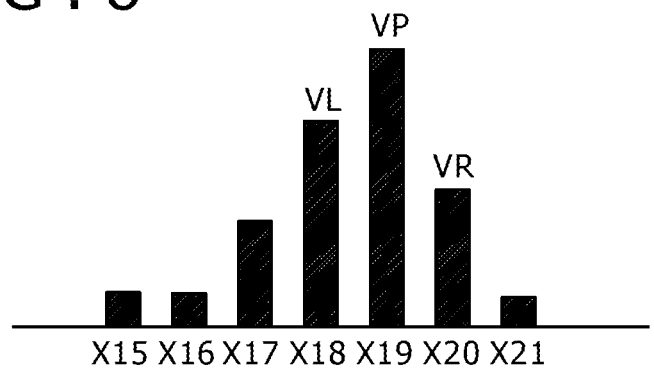
FIG. 8 is a diagram showing an example of signal level distribution in the X-axis partial scan operation in an embodiment of the position detecting device according to this invention.

FIG. 8 shows one example of the signal level distribution in this case, and shows the signal level in association with the electrode number of the X-axis electrode connected to the negative-side input terminal of the differential amplifier circuit 105 when this signal level is obtained. In the example of FIG. 8, the signal level obtained when the X-axis electrode X19 is connected to the negative-side input terminal of the differential amplifier circuit 105 is the highest. When the peak level thereof is defined as VP and the levels obtained when the X-axis electrodes adjacent to the X-axis electrode corresponding to this peak level are defined as VR and VL, the X-coordinate CX of the indicator such as a finger is obtained by the following expression.

$$CX = Px + (DX/2) * (VR - VL) / (2 * VP - VR - VL) \quad \text{(Equation 1)}$$

In this equation, Px represents the coordinate of the electrode with which the peak level is detected (here, X-axis electrode X19) and DX represents the arrangement interval of the X-axis electrodes.

Figure 9:
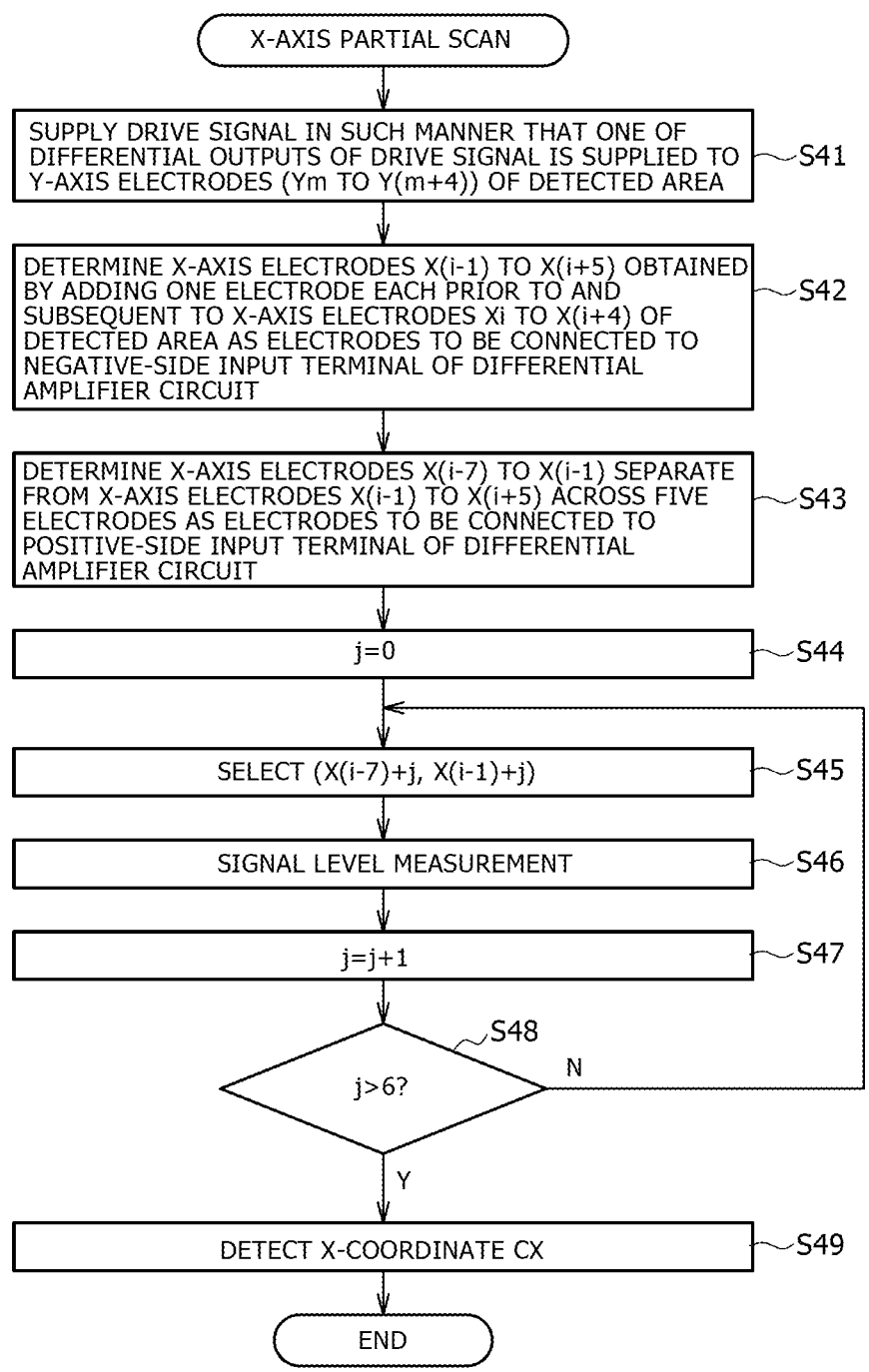
FIG. 9 is a diagram showing a flowchart of the X-axis partial scan operation in an embodiment of the position detecting device according to this invention.

FIG. 9 is a flowchart showing one example of the flow of the X-axis partial scan operation in this embodiment.

First, the control circuit 109 carries out control based on the selection control signal SW1 supplied to the selection circuit 101 so that the following state may be obtained. Specifically, the positive-phase drive signal ASc from the drive circuit 103 is simultaneously supplied to five Y-axis electrodes Ym to Y(m+4) of the area detected by the whole-surface scan operation. Furthermore, the opposite-phase drive signal ASc! is simultaneously supplied to five Y-axis electrodes Y(m+10) to Y(m+14) of the area separate from the Y-axis electrodes Ym to Y(m+4) across one area (step S41).

In this step S41, five Y-axis electrodes Ym to Y(m+4) of the area detected by the whole-surface scan operation are selected as the electrodes connected to the positive-side terminal of the selection circuit 101 and the positive-phase drive signal ASc is supplied thereto. However, they may be selected as the electrodes connected to the negative-side terminal of the selection circuit 101 and the opposite-phase drive signal ASc! may be supplied thereto.

Subsequently, the control circuit 109 determines seven X-axis electrodes X(i−1) to X(i+5) obtained by adding one electrode each prior to and subsequent to five X-axis electrodes Xi to X(i+4) of the area detected by the whole-surface scan operation, as the X-axis electrodes to be connected to one input terminal of the differential amplifier circuit 105, specifically the negative-side input terminal in this example (step S42).

The reason why one electrode each is added prior to and subsequent to five X-axis electrodes Xi to X(i+4) of the area detected by the whole-surface scan operation is because three signal levels from three electrodes are used to obtain the coordinate in the X-axis direction of the position of the indicator in this example, as described later. The coordinate in the X-axis direction of the position of the indicator may be obtained from an odd number of signal levels larger than three obtained from the same odd number of electrodes, instead of being obtained from three signal levels obtained from three electrodes. In this case, electrodes whose number is one half of [said odd number−1] are added, respectively, prior to and subsequent to five X-axis electrodes of the area detected by the whole-surface scan.

Subsequently, the control circuit 109 determines seven X-axis electrodes X(i−7) to X(i−1) each separate from a respective one of the X-axis electrodes determined in the step S42 across a predetermined number of electrodes, specifically five electrodes in this example, as the X-axis electrodes to be connected to the other input terminal of the differential amplifier circuit 105, specifically the positive-side input terminal in this example (step S43).

In the step S42, seven X-axis electrodes X(i−1) to X(i+5) are determined as the X-axis electrodes to be connected to the negative-side input terminal of the differential amplifier circuit 105. In the step S43, seven X-axis electrodes X(i−7) to X(i−1) are determined as the X-axis electrodes to be connected to the positive-side input terminal of the differential amplifier circuit 105.

For the X-axis electrode group that is determined in the step S42 and is connected to one input terminal of the differential amplifier circuit, the X-axis electrodes X(i+5) to X(i+11) may be employed as the X-axis electrode group that is determined in the step S43 and is connected to the other input terminal of the differential amplifier circuit.

Subsequently to the step S43, the control circuit 109 initializes a variable j of repetition (j=0) (step S44). Next, the control circuit 109 controls the selection circuit 104 based on the selection control signal SW2 to connect the X-axis electrode X(i−7)+j to the positive-side input terminal of the differential amplifier circuit 105 and connect the X-axis electrode X(i−1)+j to the negative-side input terminal of the differential amplifier circuit 105 (step S45). Then, the control circuit 109 captures the digital signal from the A/D conversion circuit 108 at this timing and measures the signal level of the reception signal from the differential amplifier circuit 105 (step S46).

Next, the control circuit 109 executes processing of adding 1 to the variable j so that two X-axis electrodes are each shifted to the electrode with a larger electrode number (step S47), and determines whether or not j>6 is satisfied (step S48). Upon determining in the step S48 that j>6 is not satisfied, the control circuit 109 returns the processing to the step S45 and repeats the processing of this step S45 and the subsequent steps.

Upon determining in the step S48 that j>6 is satisfied, the control circuit 109 detects the coordinate CX in the X-axis direction of the indicator from the signal level measured in the step S46 (step S49). Through the above-described steps, the X-axis partial scan operation is ended.

[Y-Axis Partial Scan Operation]

When the X-coordinate of the position indicated by the indicator is obtained by the above-described X-axis partial scan operation, subsequently the control circuit 109 moves into the Y-axis partial scan operation for obtaining the Y-coordinate of the position indicated by the indicator. This Y-axis partial scan operation will be described below with reference to FIG. 10 and FIG. 11 about the case in which a finger as an indicator is placed at the area B in FIG. 6.

Figure 10:
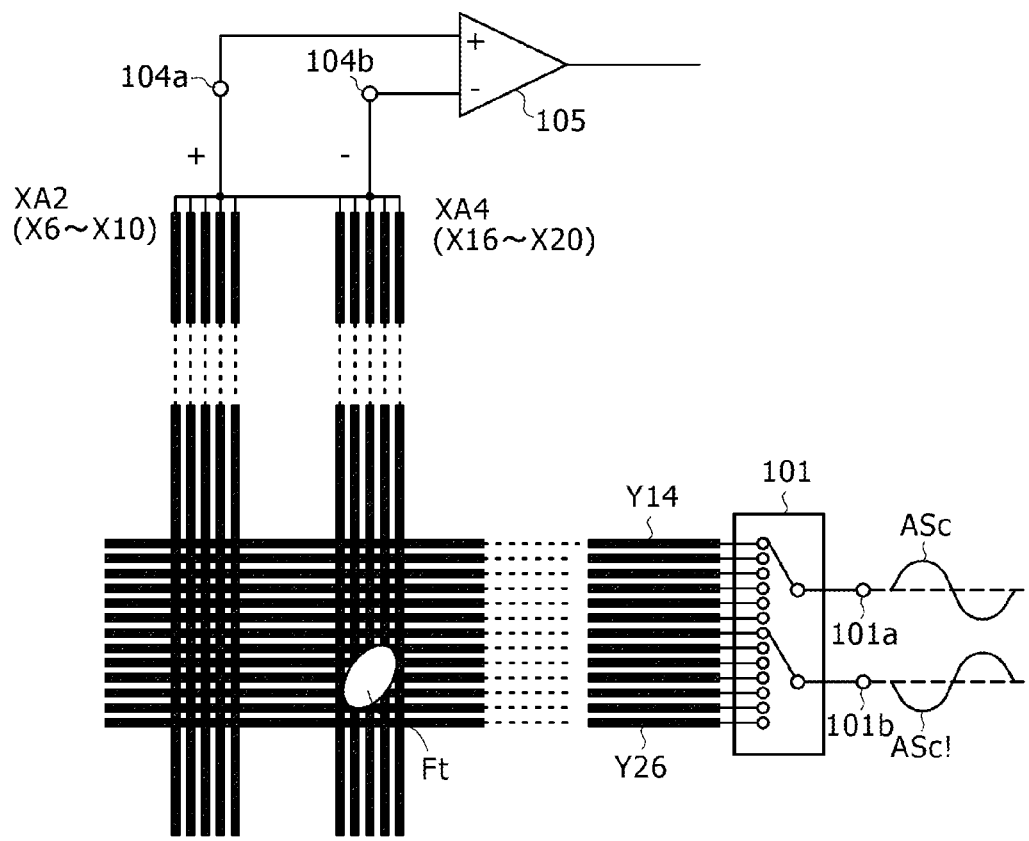
FIG. 10 is a diagram for explaining Y-axis partial scan operation in an embodiment of the position detecting device according to this invention.

FIG. 10 is a diagram showing the Y-axis partial scan operation for obtaining the Y-coordinate in the area B. In this FIG. 10, the control circuit 109 controls the selection by the selection circuit 104 based on the selection control signal SW2 so that the following state may be obtained regarding the X-axis electrodes. Specifically, similarly to the whole-surface scan operation, the combination of areas (XA2, XA4) is selected. In addition, five X-axis electrodes X6 to X10 of the area XA2 are connected to the positive-side input terminal of the differential amplifier circuit 105 and five X-axis electrodes X16 to X20 of the area XA4 separate across one area are connected to the negative-side input terminal.

In this state, the control circuit 109 controls the selection circuit 101 to sequentially select the Y-axis electrodes in the following manner. Specifically, one Y-axis electrode is selected from the Y-axis electrodes Y20 to Y26, which are obtained by adding one electrode each prior to and subsequent to the Y-axis electrodes of the area YA5, and the opposite-phase drive signal ASc! from the drive circuit 103 is supplied thereto. In addition, one Y-axis electrode is selected from the Y-axis electrodes Y14 to Y20, which are respectively separate from the Y-axis electrodes Y20 to Y26, across five electrodes, and the positive-phase drive signal ASc from the drive circuit 103 is supplied thereto. With this sequential selection of the Y-axis electrodes, the control circuit 109 obtains the signal level. At this time, a signal at the level depending on the distance between the Y-axis electrodes and the finger is detected.

Five electrodes are interposed also between the Y-axis electrode, to which the positive-phase drive signal ASc is supplied, and the Y-axis electrode, to which the opposite-phase drive signal ASc! is supplied, similarly to the X-axis partial scan operation. This is because of the following reason. Specifically, if this distance is short, coordinate calculation to be described later cannot be correctly performed when an indicator such as a finger is placed at a position straddling the Y-axis electrode, to which the positive-phase drive signal ASc is supplied, and the Y-axis electrode, to which the opposite-phase drive signal ASc! is supplied. Furthermore, if this distance is too long, cancellation of the drive signal would be incomplete and the above-described offset signal increases. Therefore, it is preferable that the distance between the Y-axis electrode, to which the positive-phase drive signal ASc is supplied, and the Y-axis electrode, to which the opposite-phase drive signal ASc! is supplied, be set somewhat larger than the maximum width of the contact area assumed when an indicator such as a finger comes in contact with the detection surface of the position detecting sensor 10.

In the above-described manner, the control circuit 109 sequentially selects (Y14, Y20), (Y15, Y21), (Y16, Y22), (Y17, Y23), (Y18, Y24), (Y19, Y25), and (Y20, Y26) as sets (Yk, Yk+6) of two Y-axis electrodes selected by the selection circuit 101, and obtains the signal level of the output signal of the differential amplifier circuit 105 in association with each of the selected sets of two Y-axis electrodes.

Figure 11:
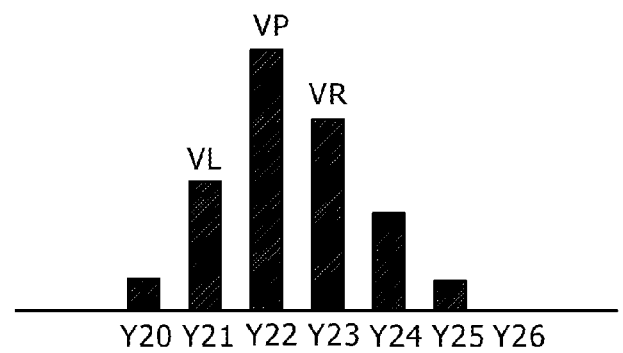
FIG. 11 is a diagram showing an example of signal level distribution in the Y-axis partial scan operation in an embodiment of the position detecting device according to this invention.

FIG. 11 shows one example of the signal level distribution in this case, and shows the signal level in association with the electrode number of the Y-axis electrode connected to the negative-side selection terminal 101b of the selection circuit 101 when this signal level is obtained. In the example of FIG. 11, the signal level obtained when the selection circuit 101 selects the Y-axis electrode Y22 to be connected to the negative-side selection terminal 101b is the highest. When the peak level thereof is defined as VP and the levels obtained when the Y-axis electrodes adjacent to the Y-axis electrode corresponding to this peak level are defined as VR and VL, the Y-coordinate CY of the indicator such as a finger is obtained by the following equation.

$$CY = Py + (DY/2)*(VR-VL)/(2*VP-VR-VL) \quad \text{(Equation 2)}$$

In this equation, Py represents the coordinate of the electrode with which the peak level is detected (here, Y-axis electrode Y22) and DY represents the arrangement interval of the Y-axis electrodes.

Figure 12:
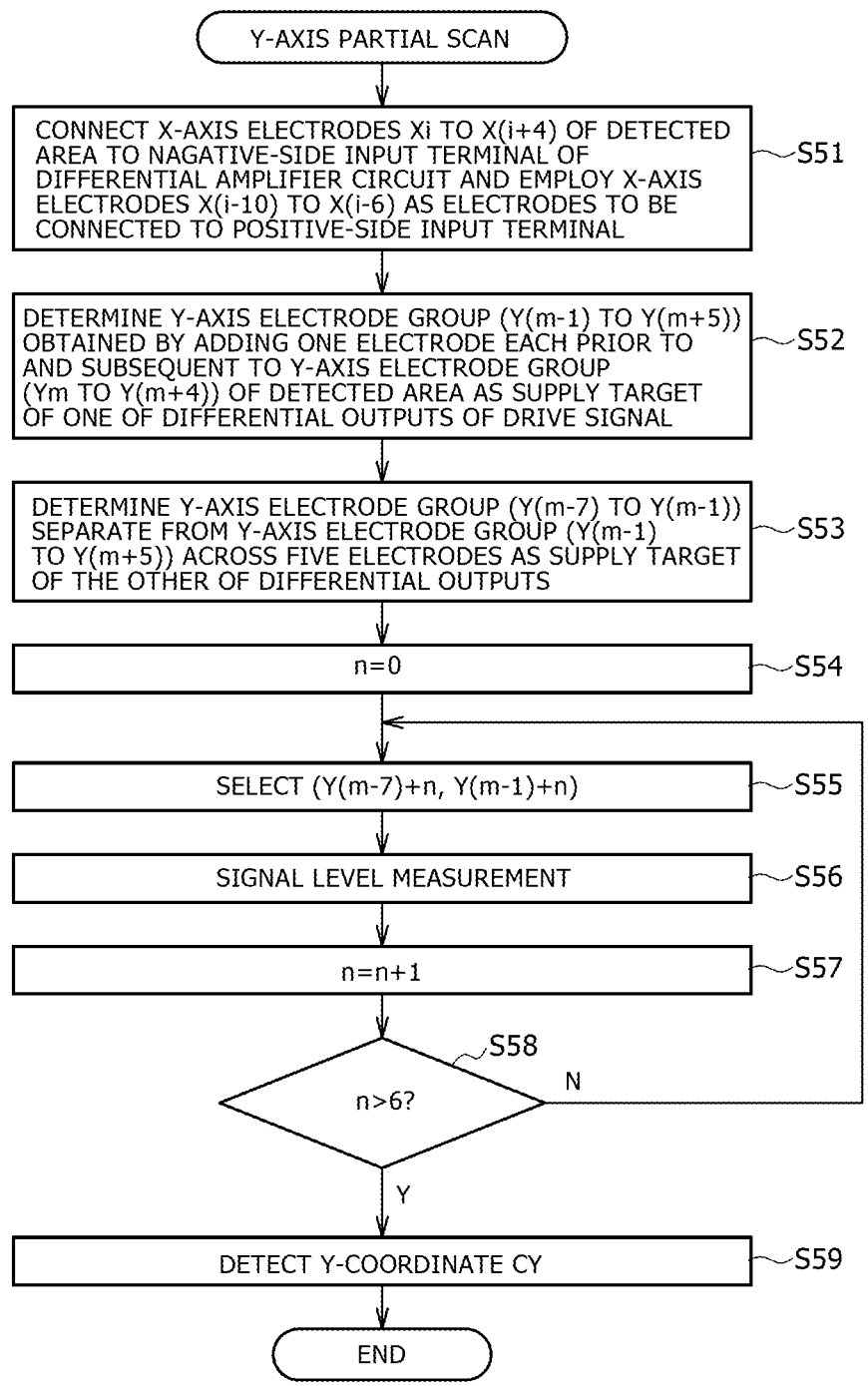
FIG. 12 is a diagram showing a flowchart of the Y-axis partial scan operation in an embodiment of the position detecting device according to this invention.

FIG. 12 is a flowchart showing one example of the flow of the Y-axis partial scan operation in this embodiment.

First, the control circuit 109 carries out control based on the selection control signal SW2 supplied to the selection circuit 104 so that the following state may be obtained. Specifically, five X-axis electrodes Xi to X(i+4) of the area detected by the whole-surface scan operation are simultaneously connected to the negative-side input terminal of the differential amplifier circuit 105. Furthermore, five X-axis electrodes X(i−10) to X(i−6) of the area separate from the X-axis electrodes Xi to X(i+4) across one area are simultaneously connected to the positive-side input terminal of the differential amplifier circuit 105 (step S51).

In this step, five X-axis electrodes Xi to X(i+4) of the area detected by the whole-surface scan operation may be connected to the positive-side input terminal of the differential amplifier circuit 105, and five X-axis electrodes X(i+10) to X(i+14) of the area separate from the X-axis electrodes Xi to X(i+4) across one area may be connected to the negative-side input terminal of the differential amplifier circuit 105.

Subsequently, the control circuit 109 determines seven Y-axis electrodes Y(m−1) to Y(m+5) obtained by adding one electrode each prior to and subsequent to five Y-axis electrodes Ym to Y(m+4) of the area detected by the whole-surface scan operation as the Y-axis electrodes, to which one of the positive-phase drive signal ASc and the opposite-phase drive signal ASc! from the drive circuit 103, specifically, e.g., the opposite-phase drive signal ASc!, is supplied (step S52).

The reason why one electrode each is added prior to and subsequent to five Y-axis electrodes Ym to Y(m+4) of the area detected by the whole-surface scan operation is because three signal levels from three electrodes are used to obtain the coordinate in the Y-axis direction of the position of the indicator in this example, as described later. The coordinate in the Y-axis direction of the position of the indicator may be obtained from an odd number of signal levels larger than three obtained from the same odd number of electrodes, instead of being obtained from three signal levels obtained from three electrodes. In this case, electrodes whose number is one half of [said odd number−1] are added, respectively, prior to and subsequent to five Y-axis electrodes of the area detected by the whole-surface scan.

Subsequently, the control circuit 109 determines seven Y-axis electrodes Y(m−7) to Y(m−1) each separate from a respective one of the Y-axis electrodes determined in the step S52 across a predetermined number of electrodes, specifically five electrodes in this example, as the Y-axis electrodes, to which the other of the positive-phase drive signal ASc and the opposite-phase drive signal ASc! from the drive circuit 103, specifically, e.g., the positive-phase drive signal ASc, is supplied (step S53).

For the Y-axis electrode group that is determined in the step S52 and is supplied with one of the positive-phase drive signal ASc and the opposite-phase drive signal ASc!, the Y-axis electrodes Y(m+5) to Y(m+11) may be employed as the Y-axis electrode group that is determined in the step S53 and is supplied with the other of the positive-phase drive signal ASc and the opposite-phase drive signal ASc!.

Subsequently to the step S53, the control circuit 109 initializes a variable n of repetition (n=0) (step S54). Next, the control circuit 109 controls the selection circuit 101 based on the selection control signal SW1 to supply one of the positive-phase and opposite-phase drive signals from the drive circuit 103 to the Y-axis electrode Y(m−7)+n and supply the other of the positive-phase and opposite-phase drive signals from the drive circuit 103 to the Y-axis electrode Y(m−1)+n (step S55). Then, the control circuit 109 captures the digital signal from the A/D conversion circuit 108 at this timing and measures the signal level of the reception signal from the differential amplifier circuit 105 (step S56).

Next, the control circuit 109 executes processing of adding 1 to the variable n so that two Y-axis electrodes are each shifted to the electrode with a larger electrode number (step S57), and determines whether or not n>6 is satisfied (step S58). Upon determining in the step S58 that n>6 is not satisfied, the control circuit 109 returns the processing to the step S55 and repeats the processing of this step S55 and the subsequent steps.

Upon determining in the step S58 that n>6 is satisfied, the control circuit 109 detects the Y-coordinate CY of the indicator from the signal level measured in the step S56 (step S59). Through the above-described steps, the Y-axis partial scan operation is ended.

[Tracking Scan Operation]

When the accurate coordinates of the indicated position are obtained by the above-described X-axis partial scan operation and Y-axis partial scan operation, the control circuit 109 continuously carries out tracking scan operation for tracking the movement of the position indicated by the indicator.

In this tracking scan operation, electrodes in the vicinity of the position that has been already obtained are sequentially selected and the signal level is obtained. Furthermore, based on the above-described (Equation 1) and (Equation 2), the X-coordinate and the Y-coordinate of the position indicated by the indicator are updated.

This tracking scan operation may be a processing similar to the above-described X-axis partial scan operation and Y-axis partial scan operation. However, it is preferable that the selection range as the scan target be set somewhat smaller because only a signal by a specific indicator is to be detected. In this embodiment, the tracking scan operation in a small range is carried out based on that the position indicated by the indicator becomes known by the above-described X-axis partial scan operation and Y-axis partial scan operation. This tracking scan operation is composed of X-axis tracking scan operation to detect movement in the X-axis direction and Y-axis tracking scan operation to detect movement in the Y-axis direction.

An operation example of this tracking scan operation will be described below for the case in which the existence of a finger near the intersection of the X-axis electrode X19 and the Y-axis electrode Y22 has been detected by the X-axis partial scan operation and the Y-axis partial scan operation. The description will be made based on the premise that, also in this tracking scan operation, the selection circuits 101 and 104 connect the electrodes with smaller electrode numbers among the selected electrodes to the positive-side selection terminals 101a and 104a and connect the electrodes with larger electrode numbers to the negative-side selection terminals 101b and 104b.

Figure 13:
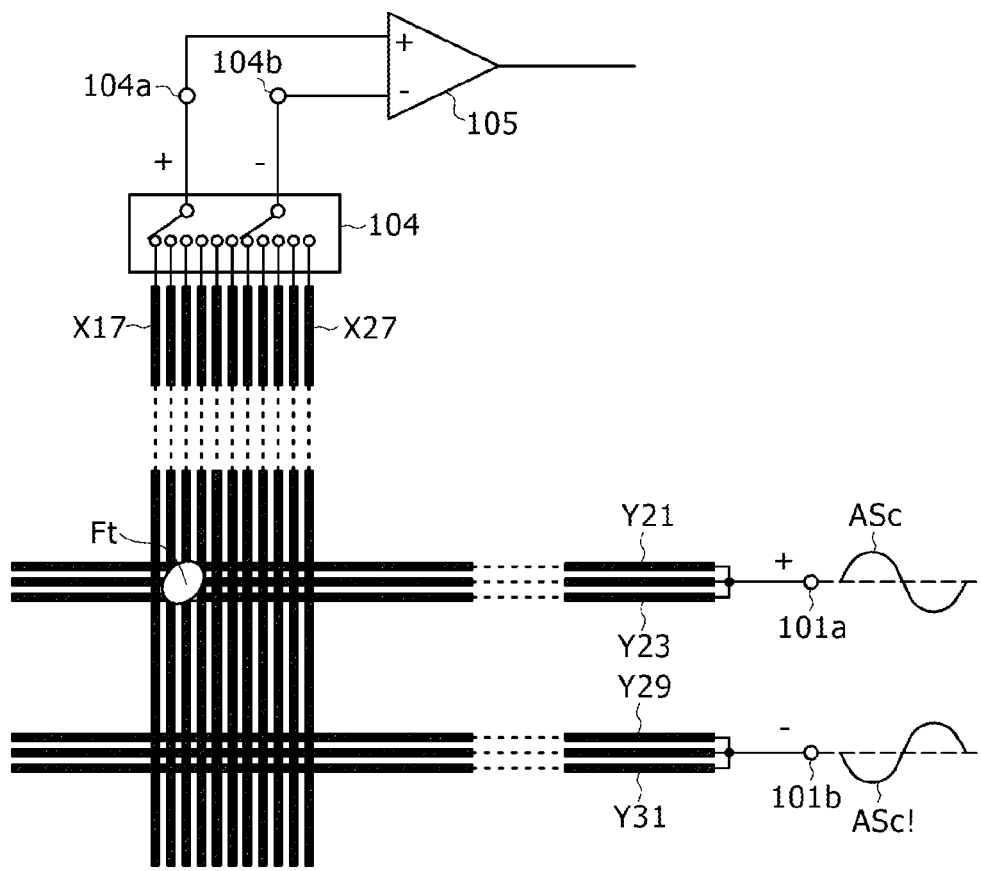
FIG. 13 is a diagram for explaining X-axis tracking scan operation in an embodiment of the position detecting device according to this invention.

FIG. 13 is a diagram showing an example of the X-axis tracking scan operation. This diagram shows the case in which the selection circuits 101 and 104 select the electrodes in such a manner that the electrodes of the area as the tracking target are connected to the positive-side selection terminals 101a and 104a, respectively.

In this X-axis tracking scan operation, the size of the area of the X-axis electrodes as the tracking target (referred to as the tracking area) is set equivalent to plural electrodes centered at the X-coordinate CX of the detected indicator, specifically five electrodes in this example. Therefore, the selection by the selection circuit 104 is so controlled that each X-axis electrode of this tracking area is connected to the positive-side input terminal of the differential amplifier circuit 105. Furthermore, in this embodiment, the selection by the selection circuit 104 is so controlled that the X-axis electrode separate from the X-axis electrode connected to the positive-side input terminal with the intermediary of five electrodes is connected to the negative-side input terminal of the differential amplifier circuit 105. The distance between the X-axis electrodes connected to the positive-side input terminal and the negative-side input terminal of the differential amplifier circuit 105 is set because of the same reason as that for the case of the above-described X-axis partial scan operation. Furthermore, as with the above description, the distance between two electrodes connected to the positive-side input terminal and the negative-side input terminal of the differential amplifier circuit 105 is not limited to five in this example.

On the other hand, regarding the Y-axis electrode, not just one Y-axis electrode in the vicinity of the Y-coordinate of the indicator, but plural electrodes centered at this electrode, specifically three Y-axis electrodes in this example, are simultaneously selected by the selection circuit 101. The purpose of this is to allow the indicated position to be surely detected even when the indicator such as a finger moves in a short time. The selection by the selection circuit 101 is so controlled that these three Y-axis electrodes are simultaneously connected to the positive-side selection terminal 101a of the selection circuit 101. Furthermore, the selection by the selection circuit 101 is so controlled that three Y-axis electrodes separate from these three electrodes simultaneously connected to the positive-side selection terminal 101a with the intermediary of five electrodes are connected to the negative-side selection terminal 101b of the selection circuit 101.

As described above, this example is based on the assumption that a finger as an indicator exists near the intersection of the X-axis electrode X19 and the Y-axis electrode Y22. Thus, the control circuit 109 controls the selection by the selection circuit 101 in such a manner that three Y-axis electrodes Y21, Y22, and Y23 are simultaneously connected to the positive-side selection terminal 101a and three Y-axis electrodes Y29, Y30, and Y31 separate from these Y-axis electrodes Y21, Y22, and Y23 across five electrodes are simultaneously connected to the negative-side selection terminal 101b.

On the other hand, the X-axis electrodes included in the tracking area in the X-axis direction are the X-axis electrodes X17 to X21 centered at the X-axis electrode X19. Therefore, the selection circuit 104 first selects the set of the X-axis electrode X17 and the X-axis electrode X23, (X17, X23), and the signal level is obtained. Subsequently, with the selection state of the Y-axis electrodes by the selection circuit 101 kept as it is, the selection circuit 104 sequentially selects sets of the X-axis electrodes, (X18, X24), (X19, X25), (X20, X26), and (X21, X27), and the signal level is obtained.

By this operation, five electrodes centered at the X-axis electrode X19, at which the finger is placed, are sequentially selected one by one by the selection circuit 104, and the signal level when the selected electrode is connected to the positive-side selection terminal 104a thereof is obtained. At this time, the X-coordinate CX is updated based on the above-described (Equation 1) by using the signal levels obtained when three X-axis electrodes including the electrodes prior to and subsequent to the X-axis electrode, with which the peak level is detected, are selected.

Figure 14:
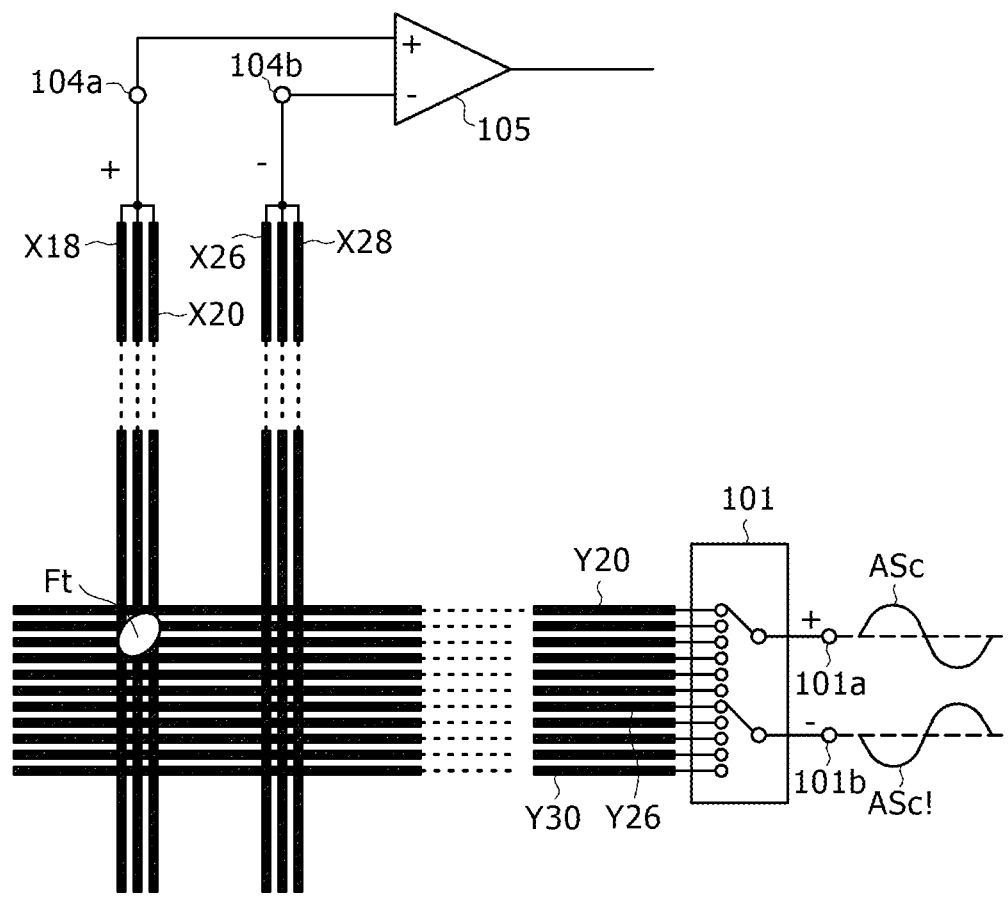
FIG. 14 is a diagram for explaining Y-axis tracking scan operation in an embodiment of the position detecting device according to this invention.

FIG. 14 is a diagram showing an example of the Y-axis tracking scan operation.

The size of the tracking area in this Y-axis tracking scan operation is determined similarly to the X-axis tracking scan operation and is set equivalent to plural electrodes centered at the Y-coordinate CY of the detected indicator, specifically five electrodes in this example.

Selection of the X-axis electrode in this Y-axis tracking scan operation is similar to the selection of the Y-axis electrode in the X-axis tracking scan operation. In this example, three X-axis electrodes are simultaneously selected by the selection circuit 104.

As described above, this example is based on the assumption that a finger as an indicator exists near the intersection of the X-axis electrode X19 and the Y-axis electrode Y22. Thus, the control circuit 109 controls the selection by the selection circuit 104 in such a manner that three X-axis electrodes X18, X19, and X20 are simultaneously connected to the positive-side selection terminal 104a and three X-axis electrodes X26, X27, and X28 separate from these X-axis electrodes X18, X19, and X20 across five electrodes are simultaneously connected to the negative-side selection terminal 104b.

On the other hand, the Y-axis electrodes included in the tracking area along the Y-axis direction are the Y-axis electrodes Y20 to Y24 centered at the Y-axis electrode Y22. Therefore, the selection circuit 101 first selects the set of the Y-axis electrode Y20 and the Y-axis electrode Y26, (Y20, Y26), and the signal level is obtained. Subsequently, with the selection state of the X-axis electrodes by the selection circuit 104 kept as it is, the selection circuit 101 sequentially selects sets of the Y-axis electrodes, (Y21, Y27), (Y22, Y28), (Y23, Y29), and (Y24, Y30), and the signal level is obtained.

By this operation, the signal levels when five electrodes centered at the Y-axis electrode Y22, at which the finger is placed, are sequentially selected one by one by the selection circuit 101 are obtained. At this time, the Y-coordinate CY is updated based on the above-described (Equation 2) by using the signal levels obtained when three electrodes including the electrodes prior to and subsequent to the Y-axis electrode, with which the peak level is detected, are selected.

As described above, in this embodiment, the tracking scan operation for the indicator (first finger) that has been detected, and the above-described whole-surface scan operation and partial scan operation, are alternately carried out. This is because when another indicator (second finger) is placed on the position detecting sensor 10, its position needs to be immediately detected.

The whole-surface scan operation at this time is carried out similarly to the above description. However, appropriate processing is executed, for example, by ignoring a signal detected when the area of the first finger is selected in this whole-surface scan operation. If the second finger is detected in the whole-surface scan operation for detecting the second finger, the control circuit 109 goes through the X-axis partial scan operation and the Y-axis partial scan operation to move into the tracking scan operation similarly to the case of the first finger.

As the order of processing when the first finger, the second finger, and the third finger are detected in this manner, the processing is executed in order of the tracking scan operation for the first finger, the tracking scan operation for the second finger, the tracking scan operation for the third finger, and the whole-surface scan operation for example.

A description will be made below about a method for accurately obtaining and tracking the position of each indicator regardless of the existence of other indicators when the number of indicators detected by the position detecting sensor 10 increases in this manner.

Figure 15A:
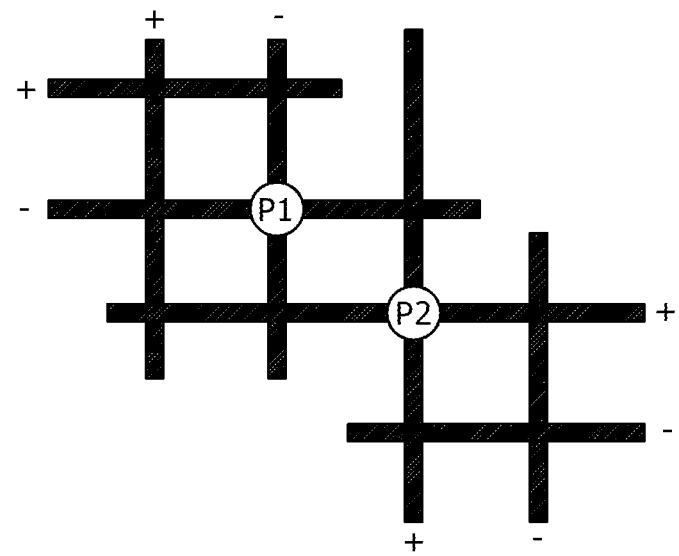
FIGS. 15A and 15B are diagrams showing a first example of tracking scan operation in an embodiment of the position detecting device according to this invention.

FIG. 15A shows a method for carrying out the tracking scan operation for each of an indicated position P1 and an indicated position P2 regarding an example in which, e.g., two fingers are placed at the indicated position P1 and the indicated position P2.

As described above, in the above-described example, in the tracking scan operation, the selection by the selection circuits 101 and 104 is controlled by the control circuit 109 in such a manner that the Y-axis electrode and the X-axis electrode of the tracking area are connected to the positive-side selection terminals 101a and 104a, respectively.

For the indicated position P2 in FIG. 15A, the selection circuits 101 and 104 can select the electrodes to make the state in which the Y-axis electrode and the X-axis electrode of the position indicated by the finger are connected to the positive-side selection terminals 101a and 104a, respectively, as shown in the diagram as with the above description. That is, because the position P1 as the other indicated position is separate from four intersections, which are formed by two X-axis electrodes and two Y-axis electrodes, the indicated position P2 can be accurately obtained without the influence of the indicator at the position P1.

However, in the tracking scan operation for the indicated position P1, if the selection circuits 101 and 104 similarly select the electrodes to connect the Y-axis electrode and the X-axis electrode of the position indicated by the finger to the positive-side selection terminals 101a and 104a, respectively, the Y-axis electrode and the X-axis electrode of the indicated position P1 are connected to the positive-side selection terminals 101a and 104a, and at the same time, the Y-axis electrode and the X-axis electrode near the indicated position P2 are connected to the negative-side selection terminals 101b and 104b. This makes it difficult to carry out the tracking scan while discriminating between the indicated position P1 and the indicated position P2.

To avoid such a state in which plural positions indicated by plural indicators are close to an intersection of the X-axis electrode and the Y-axis electrode that are selected, in the example of FIG. 15A, the selection control is so carried out that the selection circuit 101 connects the Y-axis electrode of the indicated position to the negative-side selection terminal 101b and the selection circuit 104 connects the X-axis electrode of the indicated position to the negative-side selection terminal 104b in the tracking scan operation for the indicated position P1. This makes it possible to carry out the tracking scan operation while discriminating between the indicated positions P1 and P2, as shown in FIG. 15A.

Figure 15B:
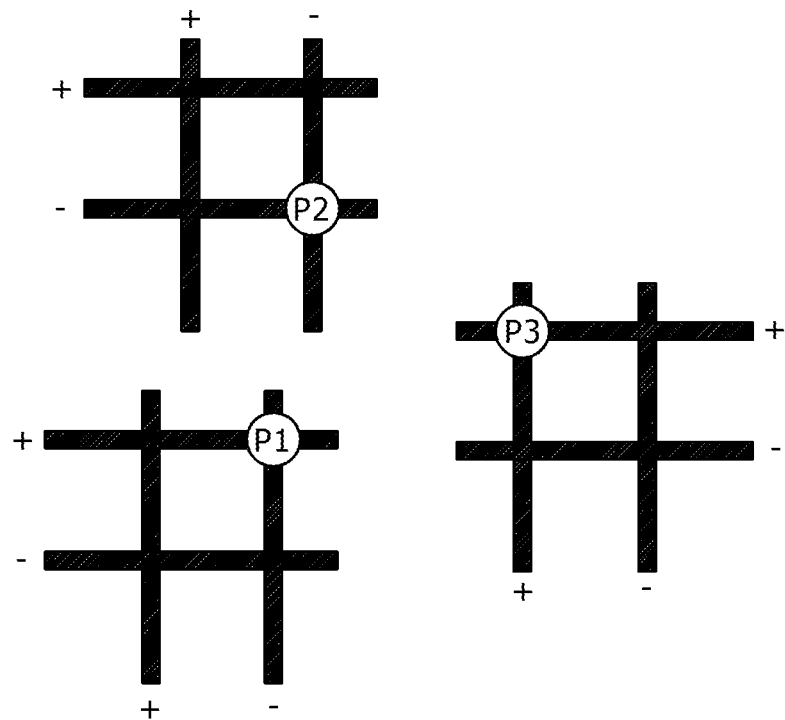

FIG. 15B shows a method for carrying out the tracking scan operation for each of an indicated position P1, an indicated position P2, and an indicated position P3 regarding an example in which three fingers are placed at the indicated position P1, the indicated position P2, and the indicated position P3.

Similarly, in this embodiment, when three positions P1, P2, and P3 indicated by fingers exist at the positions in the example of this FIG. 15B, in the tracking scan operation for the indicated position P1, the selection control is so carried out that the selection circuit 101 connects the Y-axis electrode of the indicated position P1 to the positive-side selection terminal 101a and the selection circuit 104 connects the X-axis electrode of the indicated position P1 to the negative-side selection terminal 104b. In the tracking scan operation for the indicated position P2, the selection control is so carried out that the selection circuit 101 connects the Y-axis electrode of the indicated position P2 to the negative-side selection terminal 101b and the selection circuit 104 connects the X-axis electrode of the indicated position P2 to the negative-side selection terminal 104b. In the tracking scan operation for the indicated position P3, the selection control is so carried out that the selection circuit 101 connects the Y-axis electrode of the indicated position P3 to the positive-side selection terminal 101a and the selection circuit 104 connects the X-axis electrode of the indicated position P3 to the positive-side selection terminal 104a.

In this manner, the selection circuits 101 and 104 select the connection relationship between the Y-axis electrode and the X-axis electrode of the indicated position, and the positive-side selection terminals 101a and 104a and the negative-side selection terminals 101b and 104b, based on the positions P1, P2, and P3 indicated by the indicators detected by the whole-surface scan operation and the partial scan operation. Thereby, in the tracking scan operation for each of the indicated position P1, the indicated position P2, and the indicated position P3, the tracking scan operation can be carried out while discriminating each indicator from the other indicators.

Furthermore, in this embodiment, at the peripheral part of the detection effective area of the position detecting sensor 10, the connection relationship between the electrodes at the indicated position, and the positive-side selection terminals 101a and 104a and the negative-side selection terminals 101b and 104b, selected by the selection circuits 101 and 104, is limited depending on which zone in the peripheral part of the detection effective area the position indicated by the indicator exists at.

FIGS. 16A to 16D are diagrams for explaining the connection relationship between the electrodes at the indicated position, and the positive-side selection terminals 101a and 104a and the negative-side selection terminals 101b and 104b of the selection circuits 101 and 104, at four corner positions in the detection effective area of the position detecting sensor 10.

Figure 16A:
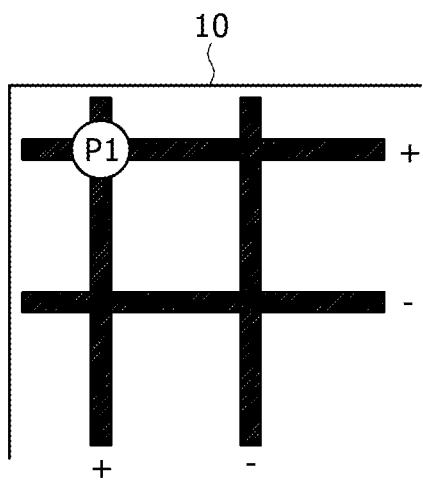
FIGS. 16A to 16D are diagrams showing a second example of tracking scan operation in an embodiment of the position detecting device according to this invention.

Specifically, as shown in FIG. 16A, when the position P1 indicated by the finger is present at the upper left corner in the detection effective area of the position detecting sensor 10, the selection control is so carried out that the selection circuit 101 connects the Y-axis electrode of the indicated position to the positive-side selection terminal 101a and the selection circuit 104 connects the X-axis electrode of the indicated position to the positive-side selection terminal 104a.

Figure 16B:
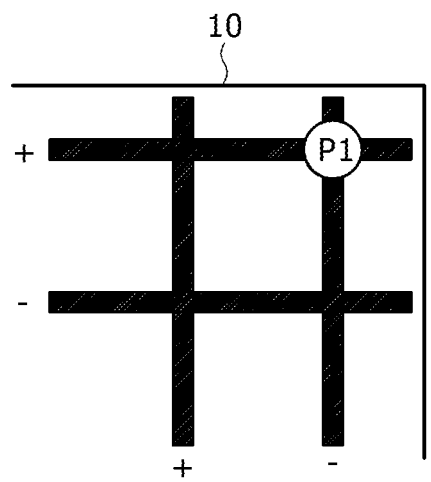

As shown in FIG. 16B, when the position P1 indicated by the finger is present at the upper right corner in the detection effective area of the position detecting sensor 10, the selection control is so carried out that the selection circuit 101 connects the Y-axis electrode of the indicated position to the positive-side selection terminal 101a and the selection circuit 104 connects the X-axis electrode of the indicated position to the negative-side selection terminal 104b.

Figure 16C:
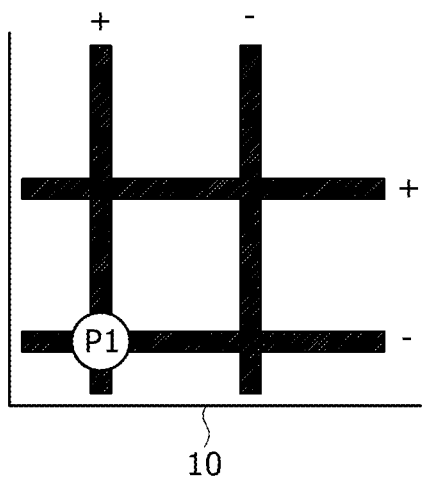

As shown in FIG. 16C, when the position P1 indicated by the finger is present at the lower left corner in the detection effective area of the position detecting sensor 10, the selection control is so carried out that the selection circuit 101 connects the Y-axis electrode of the indicated position to the negative-side selection terminal 101b and the selection circuit 104 connects the X-axis electrode of the indicated position to the positive-side selection terminal 104a.

Figure 16D:
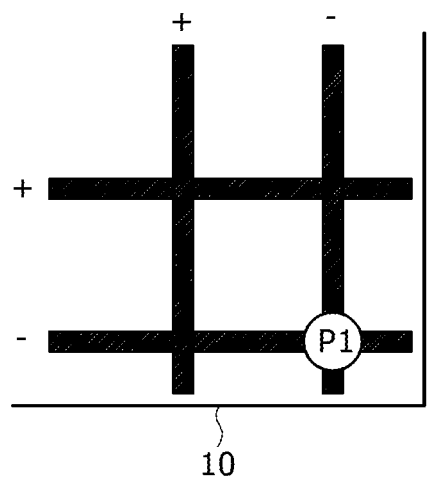

As shown in FIG. 16D, when the position P1 indicated by the finger is present at the lower right corner in the detection effective area of the position detecting sensor 10, the selection control is so carried out that the selection circuit 101 connects the Y-axis electrode of the indicated position to the negative-side selection terminal 101b and the selection circuit 104 connects the X-axis electrode of the indicated position to the negative-side selection terminal 104b.

The above description is about the case in which the indicator is detected at four corner positions in the detection effective area. As is understood from FIGS. 16A to 16D, the connection relationship between one of the X-axis electrode and the Y-axis electrode of the indicated position and one of the positive-side selection terminals 101a and 104a and the negative-side selection terminals 101b and 104b is determined depending on which of upper end, lower end, left end, and right end the detection position of the indicator is present at.

Specifically, when the detection position of the indicator is at the upper end of the detection effective area, the selection control is so carried out that the selection circuit 101 connects the Y-axis electrode of the indicated position to the positive-side selection terminal 101a. When the detection position of the indicator is at the lower end of the detection effective area, the selection control is so carried out that the selection circuit 101 connects the Y-axis electrode of the indicated position to the negative-side selection terminal 101b. When the detection position of the indicator is at the left end of the detection effective area, the selection control is so carried out that the selection circuit 104 connects the X-axis electrode of the indicated position to the positive-side selection terminal 104a. When the detection position of the indicator is at the right end of the detection effective area, the selection control is so carried out that the selection circuit 104 connects the X-axis electrode of the indicated position to the negative-side selection terminal 104b.

Figure 17A:
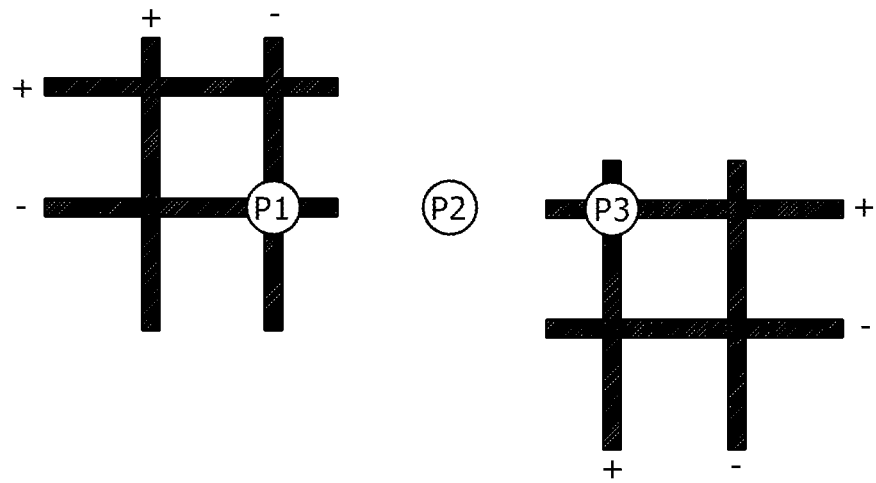
FIGS. 17A to 17C are diagrams showing a third example of tracking scan operation in an embodiment of the position detecting device according to this invention.

FIG. 17A shows an example in which positions P1, P2, and P3 indicated by three fingers are placed on a substantially a single horizontal row. In this case, in the tracking scan operation for the indicated position P1, the selection by the selection circuits 101 and 104 is so controlled that the electrodes at the indicated position are connected to the negative-side selection terminal 101b and the negative-side selection terminal 104b, respectively. Furthermore, in the tracking scan operation for the indicated position P3, the selection by the selection circuits 101 and 104 is so controlled that the electrodes at the indicated position are connected to the positive-side selection terminal 101a and the positive-side selection terminal 104a, respectively. This permits the tracking scan operation without the influence of the other indicators.

However, regarding the tracking scan operation for the indicated position P2, it is difficult to avoid the influence of the other indicators based only on the selection of the way of connecting between the Y-axis electrode and the X-axis electrode of the indicated position and the positive-side selection terminals 101a and 104a or the negative-side selection terminals 101b and 104b, in the selection circuits 101 and 104.

In this case, therefore, in this embodiment, the control circuit 109 varies the distance separating two sets of electrodes connected to the positive-side selection terminal 101a and the negative-side selection terminal 101b of the selection circuit 101, and varies the distance separating two sets of electrodes connected to the positive-side selection terminal 104a and the negative-side selection terminal 104b of the selection circuit 104, depending on the positions indicated by plural indicators detected by the whole-surface scan operation and the partial scan operation.

Figure 17B:
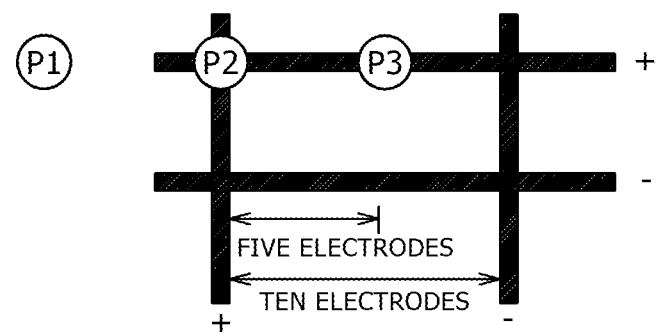

For example, as shown in FIG. 17B, in this example, in the tracking scan operation for the indicated position P2, the number of non-connected electrodes set between two sets of X-axis electrodes selected by the selection circuit 104 is not set to five, which is used in the examples described thus far, but changed to, e.g., ten. Thereby, a larger gap is made between two sets of X-axis electrodes so that the indicated position P3 may just fall within the area of this gap. This allows the correct coordinates to be obtained without the influence of the other fingers in the tracking scan operation for the indicated position P2.

Also, when positions indicated by two fingers are detected near the above-described four corners of the position detecting sensor 10, the correct coordinates can be obtained without the influence of the near finger by varying the distance separating two sets of electrodes connected to the positive-side selection terminal 101a or 104a and the negative-side selection terminal 101b or 104b of the selection circuit 101 or 104.

Figure 17C:
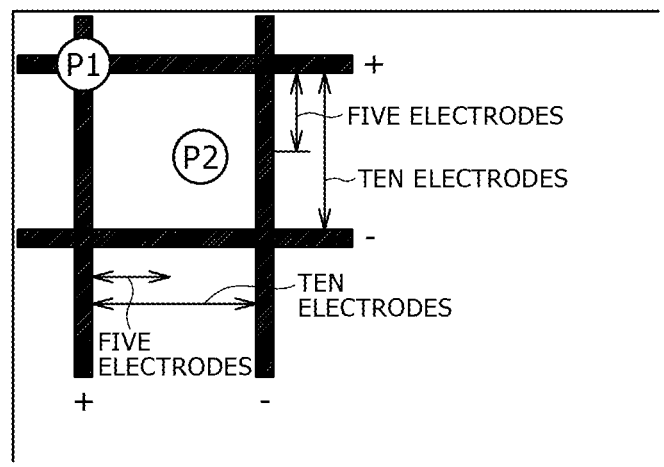
Figure 18:
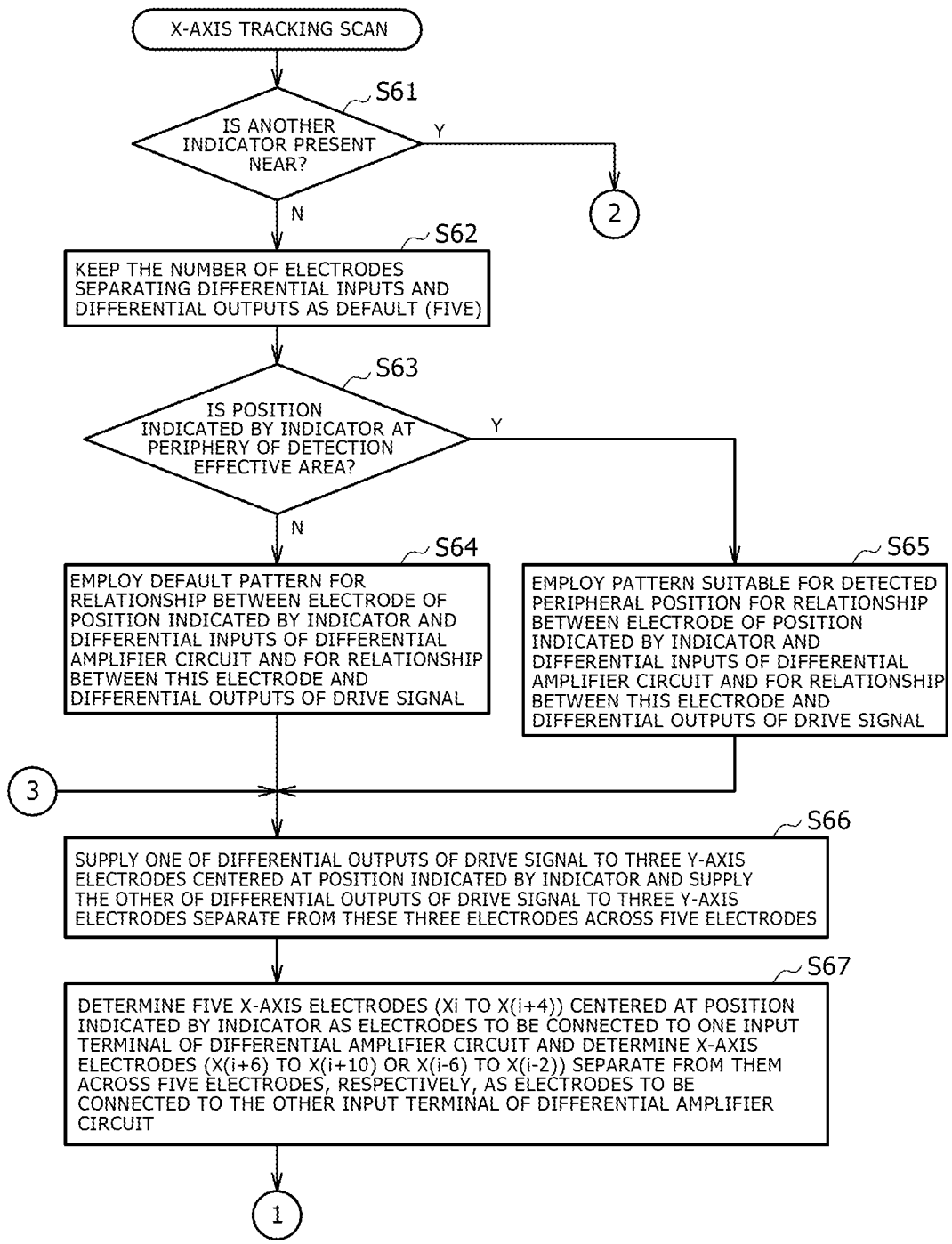
FIG. 18 is a diagram showing part of a flowchart of the X-axis tracking scan operation in an embodiment of the position detecting device according to this invention.

For example, FIG. 17C shows the case of the tracking scan operation in the vicinity of the upper left corner in the detection effective area of the position detecting sensor 10. First, it is detected that a finger is placed at an indicated position P1 and the tracking scan operation is carried out. In this case, the tracking scan operation is carried out in the state in which the electrodes are so selected that the X-axis electrode and the Y-axis electrode of the position P1 of the finger are connected to the positive-side selection terminals 104a and 101a of the selection circuits 104 and 101 as shown in FIG. 16A.

Next, suppose that the second finger is detected at an indicated position P2 near the indicated position P1 based on the subsequent whole-surface scan operation and partial scan operation. In this case, if the tracking scan operation is carried out for the indicated position P1 in the state in which the electrodes are so selected that the X-axis electrode and the Y-axis electrode of the position P1 of the finger are connected to the positive-side selection terminals 104a and 101a of the selection circuits 104 and 101 similarly, the correct position cannot be obtained due to the influence of the second finger at the indicated position P2.

In this embodiment, therefore, as shown in FIG. 17C, the sizes of the gaps separating the respective two sets of electrodes selected by the selection circuit 101 and the selection circuit 104 are set equivalent to not five electrodes, which are used in the examples described thus far, but, e.g., ten electrodes so that the indicated position P2 may just fall within the area of the gaps. In this state, the tracking scan operation is carried out.

This eliminates the influence of the second finger at the indicated position P2 in the tracking scan operation for the indicated position P1. In the tracking scan operation for the indicated position P2, the influence of the finger at the indicated position P1 can be eliminated by carrying out the tracking scan operation in the state in which the electrodes are so selected that the X-axis electrode and the Y-axis electrode of the position P2 of the finger are connected to the positive-side selection terminals 104a and 101a of the selection circuits 104 and 101.

[Example of Flow of Tracking Scan Operation]
<Example of Flow of X-Axis Tracking Scan Operation>

Of the above-described tracking scan operations, first an example of the flow of the X-axis tracking scan operation will be described below with reference to flowcharts of FIGS. 18 to 21. When plural positions indicated by fingers exist, this X-axis tracking scan operation is repeatedly carried out for each of the positions. In the following description, for simplification of explanation, the positive-phase and opposite-phase drive signals of the drive circuit 103 supplied to the positive-side selection terminal and the negative-side selection terminal of the selection circuit 101 will be referred to as the differential outputs and the positive-side input terminal and the negative-side input terminal of the differential amplifier circuit 105, to which two outputs from the positive-side selection terminal and the negative-side selection terminal of the selection circuit 104 are connected, will be referred to as the differential inputs in this specification.

The control circuit 109 first determines whether or not a position indicated by another indicator is present near the position indicated by the indicator for which the X-axis tracking scan operation is to be carried out from now (step S61). Upon determining in this step S61 that a position indicated by another indicator is not near, the control circuit 109 keeps the number of electrodes separating the respective two sets of electrodes of the differential inputs and the differential outputs as the default value, i.e., five (step S62).

Next, the control circuit 109 determines whether or not the position indicated by the indicator as the tracking target is at the periphery of the detection effective area of the position detecting sensor 10 (step S63). Upon determining that the position is not at the periphery of the detection effective area, the control circuit 109 employs the default connection relationship as the connection relationship between the X-axis electrode and the Y-axis electrode of the position indicated by the indicator and the differential inputs of the differential amplifier circuit and as the connection relationship between these X-axis and Y-axis electrodes and the differential outputs of the drive circuit 103 (step S64). In this example, the default connection relationship is such a connection relationship that the Y-axis electrode of the indicated position is connected to the positive-side selection terminal 101a by the selection circuit 101 and the X-axis electrode of the indicated position is connected to the positive-side selection terminal 104a by the selection circuit 104.

Upon determining in the step S63 that the position indicated by the indicator as the tracking target is at the periphery of the detection effective area of the position detecting sensor 10, the control circuit 109 employs the above-described connection relationship determined depending on the peripheral position at which the position indicated by the detected indicator exists as the connection relationship between the X-axis electrode and the Y-axis electrode of the position indicated by the indicator and the differential inputs of the differential amplifier circuit and as the connection relationship between these X-axis and Y-axis electrodes and the differential outputs of the drive circuit 103 (step S65).

Subsequently, after the step S64 or the step S65, the control circuit 109 supplies one of the differential outputs of the drive signal from the drive circuit 103 to three Y-axis electrodes centered at the position indicated by the indicator as the tracking target, and supplies the other of the differential outputs of the drive signal to three Y-axis electrodes separate from these three Y-axis electrodes across five electrodes (step S66).

Next, the control circuit 109 determines five X-axis electrodes (Xi to X(i+4)) centered at the position indicated by the indicator as the tracking target as the X-axis electrodes to be connected to one input terminal of the differential amplifier circuit 105, and determines five X-axis electrodes (X(i+6) to X(i+10)) or (X(i−6) to X(i−2)) each separate from a respective one of these five X-axis electrodes, across five electrodes, as the X-axis electrodes to be connected to the other input terminal of the differential amplifier circuit 105 (step S67).

Figure 19:
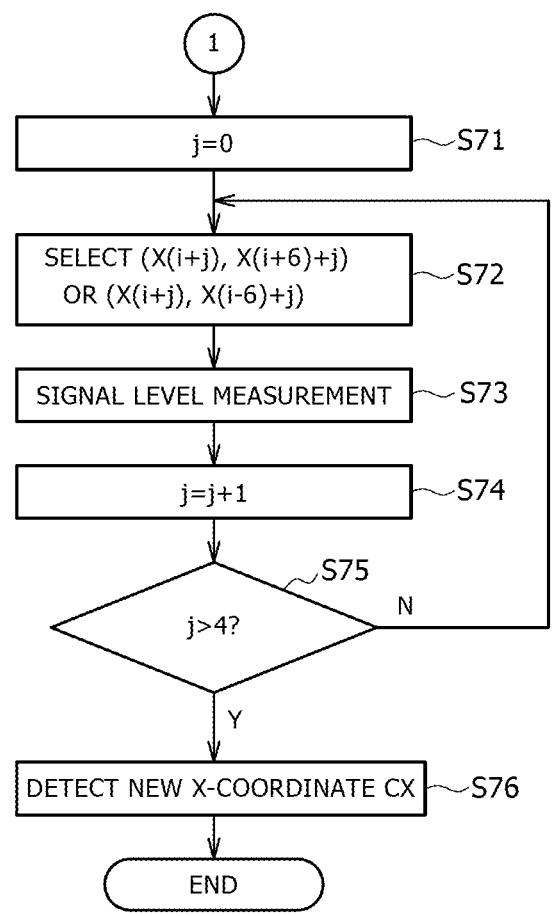
FIG. 19 is a diagram showing part of the flowchart of the X-axis tracking scan operation in an embodiment of the position detecting device according to this invention.

Subsequently to the step S67, the control circuit 109 initializes a variable j of repetition (j=0) (step S71 in FIG. 19). Next, the control circuit 109 controls the selection circuit 104 based on the selection control signal SW2 to connect the X-axis electrode X(i+j) to the positive-side input terminal of the differential amplifier circuit 105 and connect the X-axis electrode X((i+6)+j) or X((i−6)+j) to the negative-side input terminal of the differential amplifier circuit 105 (step S72). Then, the control circuit 109 captures the digital signal from the A/D conversion circuit 108 at this timing and measures the signal level of the reception signal from the differential amplifier circuit 105 (step S73).

Next, the control circuit 109 executes processing of adding 1 to the variable j so that two X-axis electrodes are each shifted to the electrode with a larger electrode number (step S74), and determines whether or not j>4 is satisfied (step S75). Upon determining in the step S75 that j>4 is not satisfied, the control circuit 109 returns the processing to the step S72 and repeats the processing of this step S72 and the subsequent steps.

Upon determining in the step S75 that j>4 is satisfied, the control circuit 109 detects the coordinate CX in the X-axis direction of the indicator from the signal level measured in the step S73 by using the above-described (Equation 1) (step S76). Then, the control circuit 109 ends this X-axis tracking scan operation.

Figure 20:
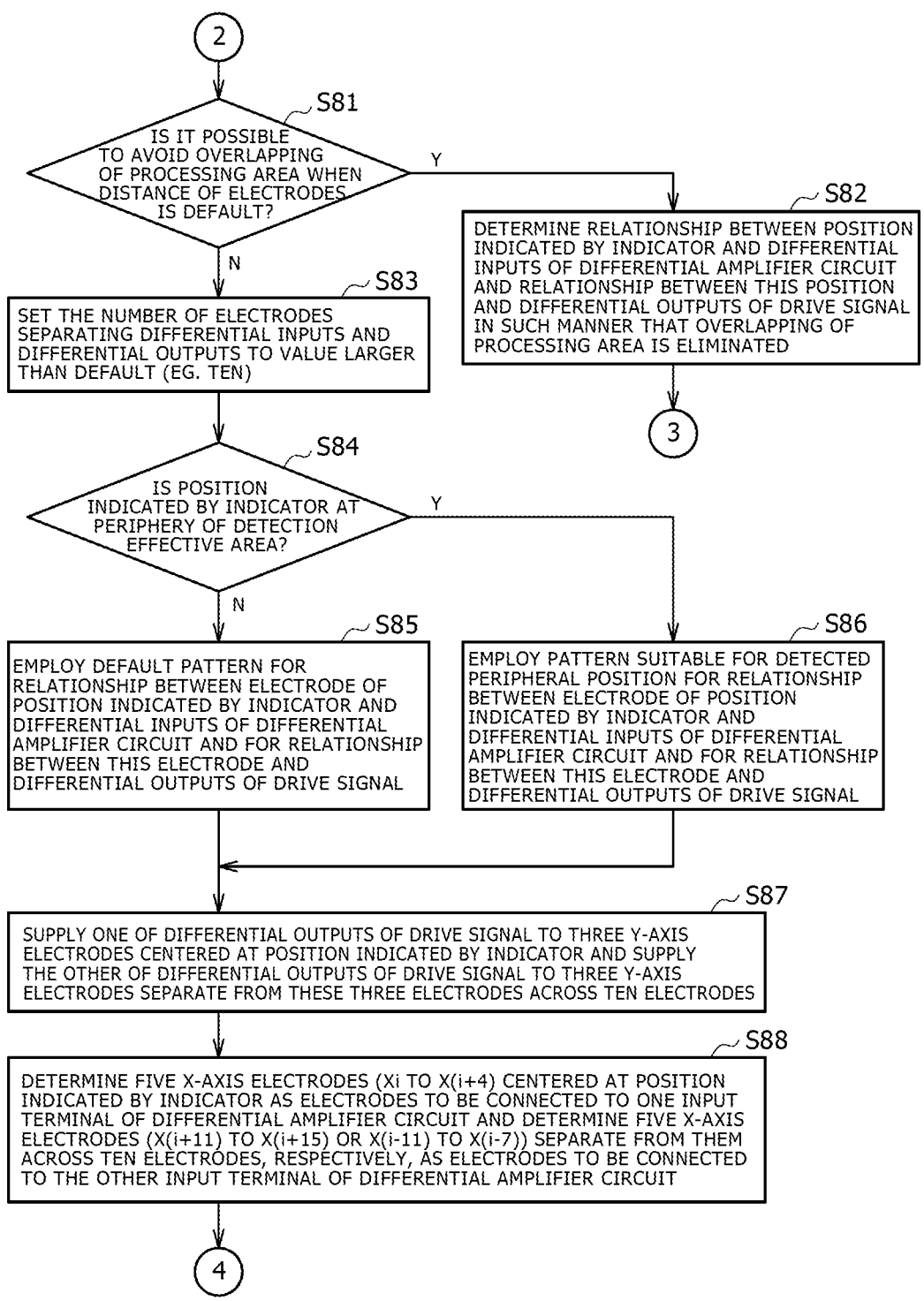
FIG. 20 is a diagram showing part of the flowchart of the X-axis tracking scan operation in an embodiment of the position detecting device according to this invention.

Upon determining in the step S61 that a position indicated by another indicator is near, the control circuit 109 determines whether or not the influence of another indicator can be avoided even when the distances separating the respective two sets of electrodes of the differential inputs and the differential outputs remain the default value of five (step S81 in FIG. 20).

Upon determining in this step S81 that the influence of another indicator can be avoided even when the distances separating the respective two sets of electrodes of the differential inputs and the differential outputs remain the default value of five, the control circuit 109 determines the connection relationship between the Y-axis electrode and the X-axis electrode of the position indicated by the indicator and the positive-side selection terminals 101a and 104a and the negative-side selection terminals 101b and 104b in the selection circuits 101 and 104 in such a manner that the processing area does not overlap with another indicator as described with use of FIGS. 15A and 15B (step S82). Then, the control circuit 109 returns the processing to the step S66 and executes the processing of this step S66 and the subsequent steps.

Upon determining in the step S81 that overlapping of the processing area with another indicator cannot be avoided when the distances separating the respective two sets of electrodes of the differential inputs and the differential outputs remain the default value of five electrodes, the control circuit 109 sets the numbers of electrodes separating the respective two sets of electrodes of the differential inputs and the differential outputs to a value larger than the default value. That is, these numbers are so set that the position indicated by another indicator is not near the intersection of the selected X-axis electrode and Y-axis electrode (step S83). In the example of this flowchart, the distance separating the electrodes is set to ten electrodes, which is more than the default value of five electrodes, regarding both the X-axis electrodes and the Y-axis electrodes for simplification of explanation. However, if the overlapping of the processing area can be avoided merely by changing the distance separating the electrodes regarding either one of the X-axis electrodes and the Y-axis electrodes, the distance separating the electrodes may be set to ten electrodes, which is more than the default value, regarding this one of the X-axis and Y-axis electrodes, and the distance separating the other electrodes may be kept as the default value. Furthermore, the number of electrodes set larger than the default value as the distance separating the electrodes is not limited to ten, and it is preferable to properly set the number depending on the position indicated by another indicator in such a manner that overlapping of the processing area is avoided.

Next, the control circuit 109 determines whether or not the position indicated by the indicator as the tracking target is at the periphery of the detection effective area of the position detecting sensor 10 (step S84). Upon determining that the position is not at the periphery of the detection effective area, the control circuit 109 employs the default connection relationship as the connection relationship between the X-axis electrode and the Y-axis electrode of the position indicated by the indicator, and the differential inputs of the differential amplifier circuit, and as the connection relationship between these X-axis and Y-axis electrodes and the differential outputs of the drive circuit 103 (step S85).

Upon determining in the step S84 that the position indicated by the indicator as the tracking target is at the periphery of the detection effective area of the position detecting sensor 10, the control circuit 109 employs the connection relationship depending on the peripheral position, at which the position indicated by the detected indicator exists, as the connection relationship between the X-axis electrode and the Y-axis electrode of the position indicated by the indicator, and the differential inputs of the differential amplifier circuit, and as the connection relationship between these X-axis and Y-axis electrodes and the differential outputs of the drive circuit 103 as described above (step S86).

In this flowchart, for easy understanding of explanation, the distances separating the respective electrodes of the X-axis electrodes and the Y-axis electrodes are decided in the step S81 to the step S83 and the connection relationship between the electrodes of the position indicated by the indicator as the tracking target and the differential inputs and the differential outputs is decided in the step S84 to the step S86. However, these decisions are not independent of each other and it is preferable that these factors be decided in association with each other in such a manner that the above-described overlapping of the processing area with another indicator does not occur.

Subsequently, after the step S85 or the step S86, the control circuit 109 supplies one of the differential outputs of the drive signal from the drive circuit 103 to three Y-axis electrodes centered at the position indicated by the indicator as the tracking target, and supplies the other of the differential outputs of the drive signal to three Y-axis electrodes separate from these three Y-axis electrodes across ten electrodes (step S87).

Next, the control circuit 109 determines five X-axis electrodes (Xi to X(i+4)) centered at the position indicated by the indicator as the tracking target as the X-axis electrodes to be connected to one input terminal of the differential amplifier circuit 105, and determines five X-axis electrodes (X(i+11) to X(i+15)) or (X(i−11) to X(i−7)) each separate from a respective one of these five X-axis electrodes across ten electrodes as the X-axis electrodes to be connected to the other input terminal of the differential amplifier circuit 105 (step S88).

Figure 21:
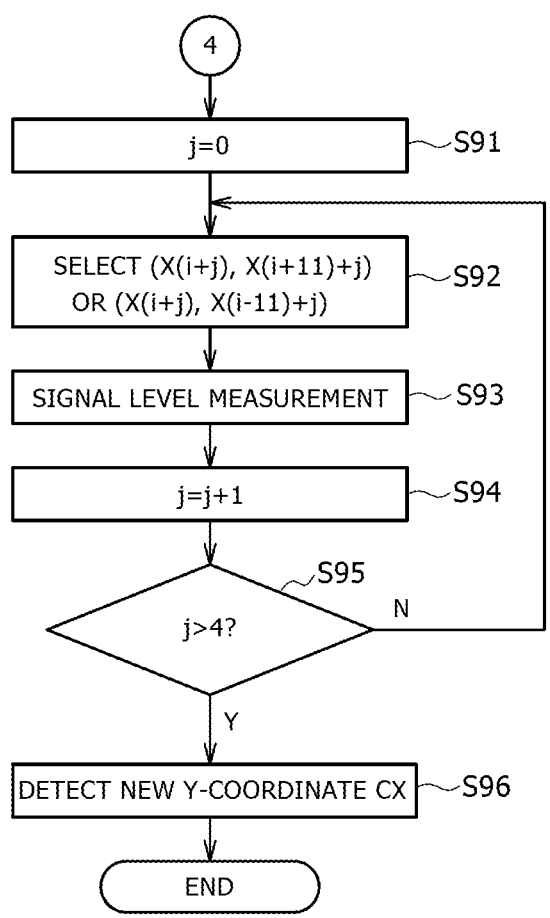
FIG. 21 is a diagram showing part of the flowchart of the X-axis tracking scan operation in an embodiment of the position detecting device according to this invention.

Subsequently to the step S88, the control circuit 109 initializes a variable j of repetition (j=0) (step S91 in FIG. 21). Next, the control circuit 109 controls the selection circuit 104 based on the selection control signal SW2 to connect the X-axis electrode X(i+j) to one input terminal of the differential amplifier circuit 105 and connect the X-axis electrode X((i+11)+j) or X((i−11)+j) to the other input terminal of the differential amplifier circuit 105 (step S92). Then, the control circuit 109 captures the digital signal from the A/D conversion circuit 108 at this timing and measures the signal level of the reception signal from the differential amplifier circuit 105 (step S93).

Next, the control circuit 109 executes processing of adding 1 to the variable j so that two X-axis electrodes are each shifted to the electrode with a larger electrode number (step S94), and determines whether or not j>4 is satisfied (step S95). Upon determining in the step S95 that j>4 is not satisfied, the control circuit 109 returns the processing to the step S92 and repeats the processing of this step S92 and the subsequent steps.

Upon determining in the step S95 that j>4 is satisfied, the control circuit 109 detects the coordinate CX in the X-axis direction of the indicator from the signal level measured in the step S93 by using the above-described (Equation 1) (step S96). Then, the control circuit 109 ends this X-axis tracking scan operation.

<Example of Flow of Y-Axis Tracking Scan Operation>

Figure 22:
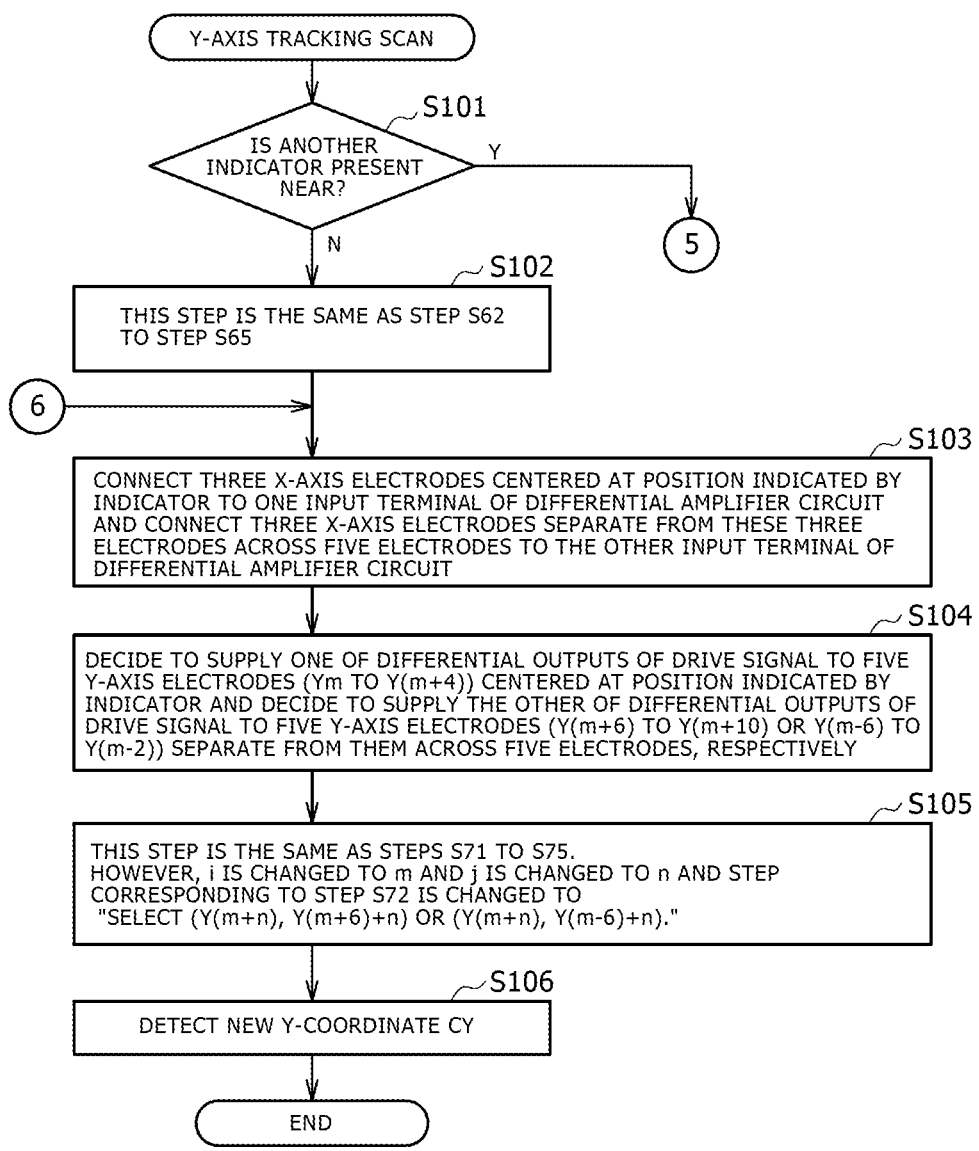
FIG. 22 is a diagram showing part of a flowchart of the Y-axis tracking scan operation in an embodiment of the position detecting device according to this invention.

An example of the flow of the Y-axis tracking scan operation will be described below with reference to flowcharts of FIGS. 22 and 23. When plural positions indicated by fingers exist, this Y-axis tracking scan operation is also repeatedly carried out for each of the positions. In the description of this Y-axis tracking scan operation, explanation is simplified by employing explanation made with use of the reference symbols of steps in FIGS. 18 to 21 for operation parts similar to those in the X-axis tracking scan operation described with use of the above-described FIGS. 18 to 21.

The control circuit 109 first determines whether or not a position indicated by another indicator is present near the position indicated by the indicator for which the Y-axis tracking scan operation is to be carried out from now (step S101). Upon determining in this step S101 that a position indicated by another indicator is not near, the control circuit 109 carries out the same operation as that of the above-described steps S62 to S65 (step S102).

Subsequently, after this step S102, the control circuit 109 connects three X-axis electrodes centered at the position indicated by the indicator as the tracking target to one input terminal of the differential amplifier circuit 105, and connects three X-axis electrodes separate from these three X-axis electrodes across five electrodes to the other input terminal of the differential amplifier circuit 105 (step S103).

Next, the control circuit 109 supplies one of the differential outputs of the drive signal from the drive circuit 103 to five Y-axis electrodes (Ym to Y(m+4)) centered at the position indicated by the indicator as the tracking target, and supplies the other of the differential outputs of the drive signal to five Y-axis electrodes (Y(m+6) to Y(m+10)) or (Y(m−6) to Y(m−2)) each separate from a respective one of these five Y-axis electrodes across five electrodes (step S104).

Subsequently to the step S104, the control circuit 109 carries out the same operation as that of the above-described steps S71 to S75 (step S105). However, in this step S105, as the variables of repetition, the above-described i is changed to n and the above-described j is changed to m. Furthermore, in the step corresponding to the above-described step S72, the control circuit 109 controls the selection circuit 101 based on the selection control signal SW1 to supply one of the differential outputs of the drive signal to the Y-axis electrodes Y(m+n) and supply the other of the differential outputs of the drive signal to the Y-axis electrodes Y((m+6)+n) or Y((m−6)+n).

Then, upon determining that n>4 is satisfied in the step corresponding to the above-described step S75 in this step S105, the control circuit 109 detects the coordinate CY in the Y-axis direction of the indicator from the signal level measured in the step corresponding to the above-described step S73 in this step S105 by using the above-described (Equation 2) (step S106). Then, the control circuit 109 ends this Y-axis tracking scan operation.

Figure 23:
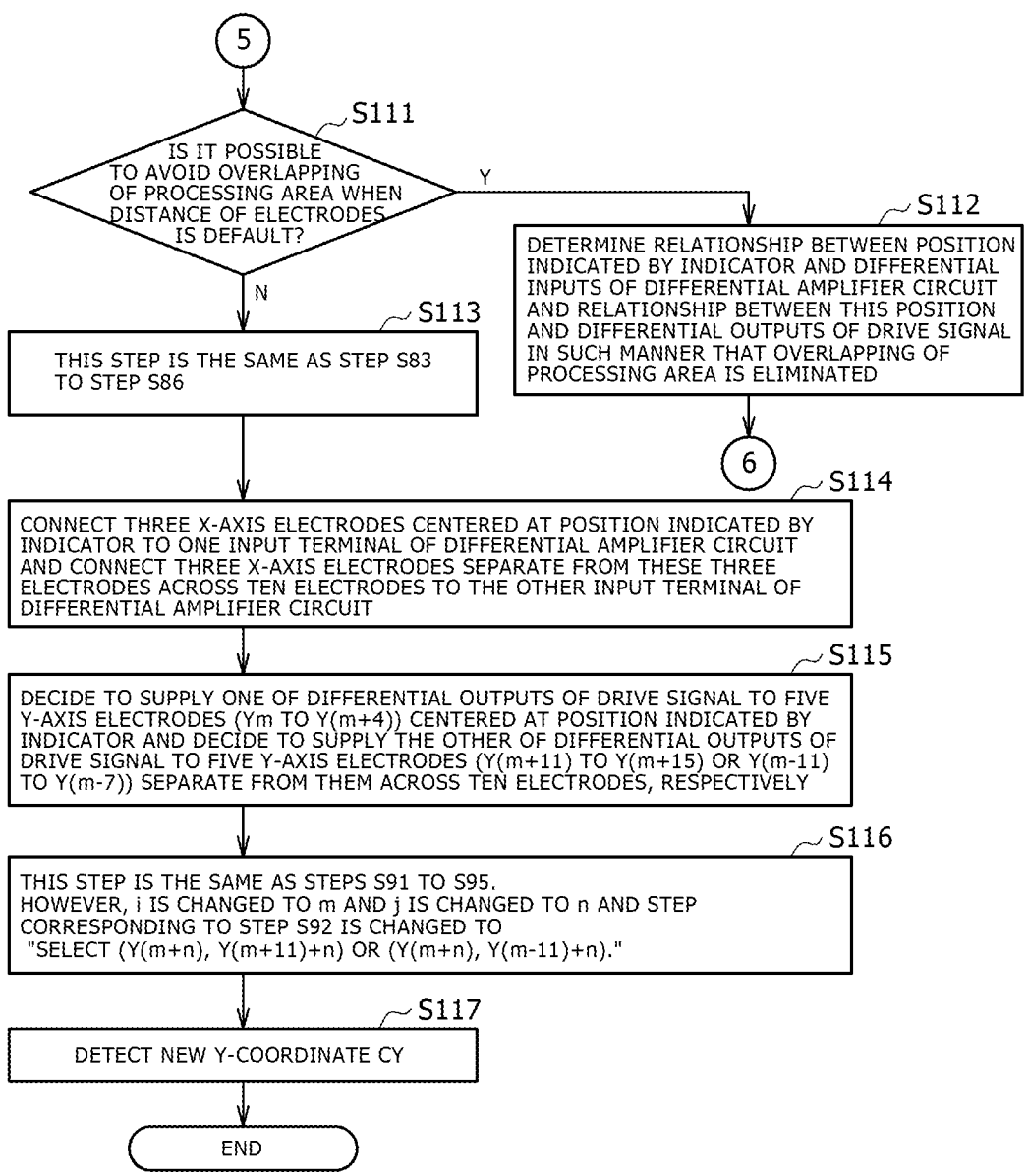
FIG. 23 is a diagram showing part of the flowchart of the Y-axis tracking scan operation in an embodiment of the position detecting device according to this invention.

Upon determining in the step S101 that a position indicated by another indicator is near, the control circuit 109 determines whether or not the influence of another indicator can be avoided even when the distances separating the respective two sets of electrodes of the differential inputs and the differential outputs remain to the default value of five electrodes (step S111 in FIG. 23).

Upon determining in this step S111 that the influence of another indicator can be avoided even when the distances separating the respective two sets of electrodes of the differential inputs and the differential outputs remain to the default value of five electrodes, the control circuit 109 determines the connection relationship between the Y-axis electrode and the X-axis electrode of the position indicated by the indicator, and the positive-side selection terminals 101*a* and 104*a* and the negative-side selection terminals 101*b* and 104*b* in the selection circuits 101 and 104, in such a manner that the processing area does not overlap with another indicator as described with use of FIGS. 15A and 15B (step S112). Then, the control circuit 109 returns the processing to the step S103 and executes the processing of this step S103 and the subsequent steps.

Upon determining in the step S111 that overlapping of the processing area with another indicator cannot be avoided when the distances separating the respective two sets of electrodes of the differential inputs and the differential outputs remain the default value of five electrodes, the control circuit 109 carries out the same operation as that of the above-described steps S83 to S86 (step S113).

Subsequently, after this step S113, the control circuit 109 connects three X-axis electrodes centered at the position indicated by the indicator as the tracking target to one input terminal of the differential amplifier circuit 105, and connects three X-axis electrodes separate from these three X-axis electrodes across ten electrodes to the other input terminal of the differential amplifier circuit 105 (step S114).

Next, the control circuit 109 supplies one of the differential outputs of the drive signal from the drive circuit 103 to five Y-axis electrodes (Ym to Y(m+4)) centered at the position indicated by the indicator as the tracking target, and supplies the other of the differential outputs of the drive signal to five Y-axis electrodes (Y(m+11) to Y(m+15)) or (Y(m−11) to Y(m−7)) each separate from a respective one of these five Y-axis electrodes across ten electrodes (step S115).

Subsequently to the step S115, the control circuit 109 carries out the same operation as that of the above-described steps S91 to S95 (step S116). However, in this step S116, as the variables of repetition, the above-described i is changed to n and the above-described j is changed to m. Furthermore, in the step corresponding to the above-described step S92, the control circuit 109 controls the selection circuit 101 based on the selection control signal SW1 to supply one of the differential outputs of the drive signal to the Y-axis electrodes Y(m+n) and supply the other of the differential outputs of the drive signal to the Y-axis electrodes Y((m+11)+n) or Y((m−11)+n).

Then, upon determining that n>4 is satisfied in the step corresponding to the above-described step S95 in this step S116, the control circuit 109 detects the coordinate CY in the Y-axis direction of the indicator from the signal level measured in the step corresponding to the above-described step S93 in this step S116 by using the above-described (Equation 2) (step S117). Then, the control circuit 109 ends this Y-axis tracking scan operation.

Also in the flowchart of this Y-axis tracking scan operation, for easy understanding of explanation, the decision of the distances separating the respective electrodes of the X-axis electrodes and the Y-axis electrodes and the decision of the connection relationship between the electrodes of the position indicated by the indicator as the tracking target and the differential inputs and the differential outputs are made independently of each other. However, these decisions are not independent of each other and it is preferable that these factors be decided in association with each other in such a manner that the above-described overlapping of the processing area with another indicator does not occur. Furthermore, the number of electrodes set larger than the default value as the distances separating the respective electrodes of the X-axis electrodes and the Y-axis electrodes is not limited to ten, as with the description of the X-axis tracking scan operation.

[Flowchart of Flow of Overall Processing]

Figure 24:
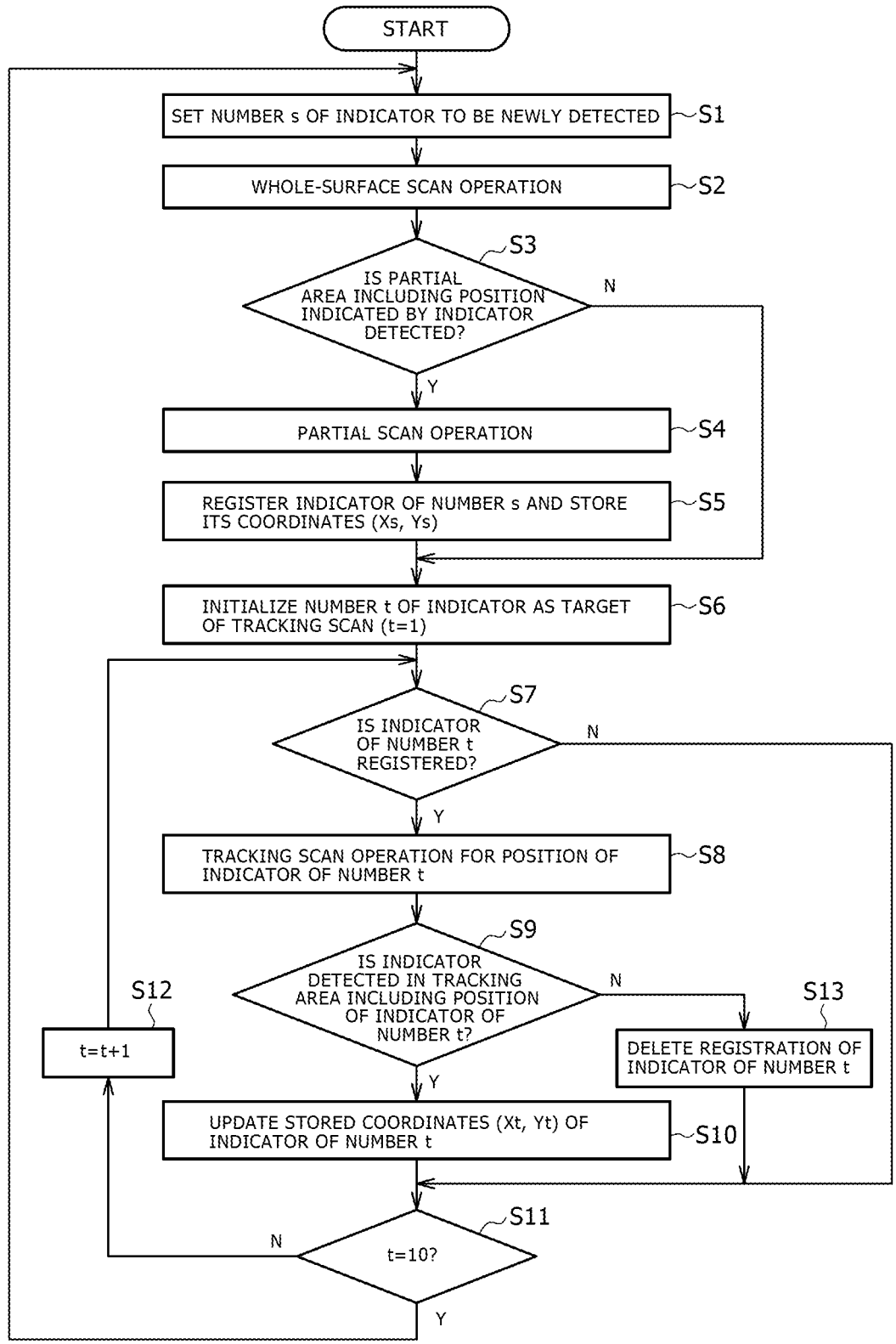
FIG. 24 is a diagram showing an overall flowchart of embodiments of the position detecting device according to this invention.

The flow of the overall processing of the tablet device 1 of this example will be described below with reference to a flowchart of FIG. 24. The example to be described below is based on the premise that the tablet device 1 can simultaneously detect ten indicators.

The control circuit 109 of the tablet device 1 first sets the number s (s=1 to 10) of an indicator to be newly detected (step S1). Next, the control circuit 109 carries out the whole-surface scan operation to check whether a finger is placed at any place on the position detecting sensor 10 (step S2).

Next, the control circuit 109 determines whether or not a partial area including a position indicated by an indicator is detected by this whole-surface scan operation (step S3). Upon determining that a partial area including a position indicated by an indicator is detected, the control circuit 109 carries out the partial scan operation about only this detected partial area to detect the precise coordinates of the position indicated by the indicator (step S4).

Subsequently, the control circuit 109 registers the indicator of the indicator number s about which the indicated position is detected by the partial scan operation as a new indicator, and stores the position (Xs, Ys) indicated by this detected indicator in a built-in buffer memory (step S5).

Next, the control circuit 109 initializes the number t (t=1 to 10) of the indicator for which the tracking scan is to be carried out, i.e., sets t=1 (step S6). Upon determining in the step S3 that a partial area including a position indicated by an indicator is not detected by the whole-surface scan operation, the control circuit 109 jumps the processing to this step S6.

Subsequently to this step S6, the control circuit 109 determines whether or not the indicator of the number t is registered (step S7). Upon determining in this step S7 that the indicator of the number t is registered, the control circuit 109 carries out the tracking scan operation in a tracking area substantially centered at the indicated position stored in the step S5 in order to track the movement of the position indicated by this indicator of the number t (step S8).

Next, the control circuit 109 determines whether or not the indicator could be detected in the tracking area including the position indicated by the indicator of the number t (step S9). Upon determining in this step S9 that the indicator of the number t could be detected, the control circuit 109 updates the position coordinates of the indicator of the number t stored in the buffer memory to the position coordinates (Xt, Yt) of the newly detected indicated position (step S10).

Subsequently to the step S10, the control circuit 109 determines whether or not the number t of the indicator for which the tracking scan has been performed satisfies t=10 (step S11). Upon determining that t=10 is not satisfied, the control circuit 109 performs processing of t=t+1 to set the next indicator number as the tracking scan target (step S12). Then, the control circuit 109 returns the processing to the step S7 and repeats the processing of this step S7 and the subsequent steps.

Upon determining in the step S11 that t=10 is satisfied, the control circuit 109 returns the processing to the step S1 and repeats the above-described processing of the step S1 and the subsequent steps.

Upon determining in the step S9 that the indicator could not be detected, the control circuit 109 deletes the registration of the indicator of the number t (step S13). Then, the control circuit 109 forwards the processing from the step S13 to the step S11 and executes the above-described processing of the step S11 and the subsequent steps.

Effects of Embodiments

As described above, according to the tracking scan operation of the above-described embodiment, even when plural fingers are placed on the detection surface of the position detecting sensor 10, the position of each point can be tracked and correctly obtained without the influence of the plural fingers on each other by controlling the selection by the selection circuits 101 and 104 in the following manner. Specifically, the electrodes of the position indicated by the finger are selected at only one point among four points formed by two sets of the Y-axis electrodes connected to the positive-side selection terminal and the negative-side selection terminal of the selection circuit 101 and two sets of the X-axis electrodes connected to the positive-side selection terminal and the negative-side selection terminal of the selection circuit 104.

Furthermore, in the above-described embodiments, two sets of the X-axis electrodes are selected as the receiving-side electrodes and signals from one and the other of these two sets of the X-axis electrodes are supplied to the positive-side input terminal and the negative-side input terminal of the differential amplifier circuit 105 to perform differential amplification. Thus, external noise from, e.g., an LCD can be canceled, which allows stable and accurate coordinate detection.

Moreover, in the above-described embodiments, plural electrodes adjacent to each other are simultaneously selected and cursory position detection is performed in the whole-surface scan operation. Thus, there is also an advantage that the whole-surface scan operation can be carried out quickly and position detection can be performed quickly even if the size of the detection surface of the position detecting sensor 10 increases.

Other Embodiments and Modification Examples

In the above-described embodiments, the drive signal is supplied to the Y-axis electrode and the X-axis electrode is employed as the receiving electrode. However, the drive signal may be supplied to the X-axis electrode and the Y-axis electrode may be employed as the receiving electrode.

Furthermore, in the above-described embodiments, the control circuit 109 starts position detection from the whole-surface scan. In this case, the whole-surface scan can be applied not only to the whole area of the position detecting sensor 10 as the scan range, but also to a limited area range such as only the right half or left half of the position detecting sensor 10 as the scan range.

What is claimed is:

1. A position detecting device including a sensor having an electrode pattern formed of a plurality of first electrodes arranged in a first direction and a plurality of second electrodes arranged in a second direction intersecting with the first direction, the position detecting device supplying a drive signal to the first electrodes and detecting a position of an indicator on the electrode pattern from a reception signal obtained from the second electrodes, the position detecting device comprising:
a first selection circuit configured to select two sets of the second electrodes, which are separate from each other by a distance equivalent to a second predetermined number of electrodes, from the plurality of second electrodes;
a second selection circuit configured to select two sets of the first electrodes, which are separate from each other by a distance equivalent to a first predetermined number of electrodes, from the plurality of first electrodes;
a drive signal supply circuit configured to supply the drive signal to each of the two sets of the first electrodes selected by the second selection circuit by outputting two signals having phases inverted from each other;
a differential amplifier circuit having a non-inverting input terminal, to which one set of the two sets of the second electrodes selected by the first selection circuit is connected, and an inverting input terminal, to which the other set of the two sets of the second electrodes is connected;
a detection circuit configured to detect the position of the indicator on the electrode pattern from an output signal of the differential amplifier circuit; and
a control circuit that controls selection by the first and second selection circuits by determining the first and second predetermined numbers in such a manner that, when positions of plural indicators are detected by the detection circuit, only one intersection among four intersections, which are respectively formed by the two sets each of electrodes selected by the first and second selection circuits, is near the position of one of the plural indicators and the three other intersections are not near any of the plural indicators.

2. The position detecting device according to claim 1, wherein
a plurality of electrodes are included in each of the two sets each of electrodes selected by the first selection circuit and the second selection circuit, and the plurality of electrodes included in each set are simultaneously connected to the drive circuit and the differential amplifier circuit by the first selection circuit and the second selection circuit to detect a rough position of the indicator.

3. The position detecting device according to claim 1, wherein
the first electrodes and the second electrodes are formed of transparent electrodes and the sensor is obtained by forming the electrode pattern on a transparent substrate.

4. The position detecting device according to claim 3, wherein
the sensor is provided on a display surface of a display device.

5. A position detecting device including a sensor having a lattice-shaped electrode pattern formed of a plurality of first electrodes arranged in a first direction and a plurality of second electrodes arranged in a second direction intersecting with the first direction, the position detecting device supplying a transmission signal to the first electrodes and detecting a position of a first indicator on the electrode pattern from a reception signal obtained from the plurality of second electrodes, the position detecting device comprising:
a drive signal supply circuit configured to supply a predetermined drive signal to the first electrodes;
a first selection circuit configured to select two sets of the second electrodes, which are separate from each other by a distance equivalent to a predetermined number of electrodes, from the plurality of second electrodes;
a second selection circuit configured to select the first electrode, to which the drive signal is supplied;
a differential amplifier circuit having a non-inverting input terminal, to which one set of the two sets of the second electrodes is connected, and an inverting input terminal, to which the other set is connected;
a detection circuit configured to detect the position of the first indicator on the electrode pattern from an output signal of the differential amplifier circuit; and
a control circuit that carries out, for the first selection circuit, first selection control to select the two sets of the second electrodes in such a manner that, when positions of plural indicators including the first indicator are detected by the detection circuit and when a signal from the second electrode at the detected position of the first indicator is supplied to one terminal of the non-inverting input terminal and the inverting input terminal of the differential amplifier circuit, a signal from the second electrode where none of the plural indicators is at is supplied to the other terminal of the differential amplifier circuit.

6. The position detecting device according to claim 5, wherein
in the first selection control for the first selection circuit, the control circuit changes the distance equivalent to the predetermined number of electrodes in the selection of the two sets of the second electrodes.

7. The position detecting device according to claim 5, wherein
two signals in phase opposition to each other are employed as the drive signal,
the second selection circuit is controlled by the control circuit in such a manner as to select two sets of the first electrodes, which are separate from each other by a distance equivalent to a predetermined number of electrodes, from the plurality of first electrodes,
one signal of the two signals in phase opposition to each other as the drive signal is supplied to one set of the two sets of the first electrodes selected by the second selection circuit and the other signal is supplied to the other set of the two sets of the first electrodes, and
the control circuit carries out, for the second selection circuit, second selection control to select the two sets of the first electrodes in such a manner that one signal of the two signals in phase opposition to each other as the drive signal is supplied to the first electrode at the detection position of the first indicator, and the other signal is supplied to the first electrode where none of the plural indicators is at.

8. The position detecting device according to claim 7, wherein
in the second selection control for the second selection circuit, the control circuit changes the distance equivalent to the predetermined number of electrodes in the selection of the two sets of the first electrodes.

9. The position detecting device according to claim 7, wherein
the control circuit executes first detection processing of detecting the position of the indicator over an area of the lattice-shaped electrode pattern by controlling the selection of the two sets of the second electrodes in the first selection circuit and by controlling the selection of the two sets of the first electrodes in the second selection circuit,
when the indicator is detected by the first detection processing, the control circuit carries out control to execute second detection processing of detecting the position of the indicator over a partial area centered at a position at which the indicator is detected, by controlling the selection of the two sets of the second electrodes in the first selection circuit in such a manner that each of a plurality of second electrodes included in the partial area forms one set of the second electrodes and each second electrode separate from the second electrode in said one set by a distance equivalent to a predetermined number of electrodes forms the other set, and
the control circuit carries out said first selection control for the first selection circuit only in the second detection processing, and repeatedly alternates between the first detection processing and the second detection processing.

10. The position detecting device according to claim 9, wherein
after executing the first detection processing and the second detection processing, the control circuit carries out control to execute third detection processing of detecting the position of the indicator in the first direction over the partial area centered at the position at which the indicator is detected, by controlling the selection of the two sets of the first electrodes in the second selection circuit in such a manner that each of a plurality of first electrodes included in the partial area forms one set of the first electrodes and each first electrode separate from the first electrode in said one set by a distance equivalent to a predetermined number of electrodes forms the other set, and the control circuit carries out said second selection control for the second selection circuit only in the third detection processing.

11. The position detecting device according to claim 5, wherein
the position of the indicator on the electrode pattern is detected by detecting change in capacitance between the electrode pattern and the indicator.

* * * * *